US012123154B2

(12) United States Patent
Young

(10) Patent No.: US 12,123,154 B2
(45) Date of Patent: Oct. 22, 2024

(54) FOLDABLE TEMPORARY AND PORTABLE ROAD SIGN STRUCTURE

(71) Applicant: TAS ROADS PTY LTD, Deloraine (AU)

(72) Inventor: Allen Renwick Young, Deloraine (AU)

(73) Assignee: TRANEX ROADS & TRAFFIC PTY LTD., Deloraine (AU)

( * ) Notice: Subject to any disclaimer, the term of this patent is extended or adjusted under 35 U.S.C. 154(b) by 537 days.

(21) Appl. No.: 17/279,273

(22) PCT Filed: Sep. 26, 2019

(86) PCT No.: PCT/AU2019/051038
§ 371 (c)(1),
(2) Date: Mar. 24, 2021

(87) PCT Pub. No.: WO2020/061635
PCT Pub. Date: Apr. 2, 2020

(65) Prior Publication Data
US 2022/0002955 A1 Jan. 6, 2022

(30) Foreign Application Priority Data
Sep. 27, 2018 (AU) ................................ 2018903647

(51) Int. Cl.
*G09F 15/00* (2006.01)
*B32B 3/12* (2006.01)
(Continued)

(52) U.S. Cl.
CPC ................ *E01F 9/646* (2016.02); *B32B 3/12* (2013.01); *B32B 27/32* (2013.01); *E01F 9/692* (2016.02);
(Continued)

(58) Field of Classification Search
CPC .......... G09F 3/10; G09F 7/18; G09F 15/0012; G09F 15/0018; G09F 1/06; G09F 1/065;
(Continued)

(56) References Cited

U.S. PATENT DOCUMENTS 666,941 A 1/1901 Streit
2,282,280 A * 5/1942 Yogg .......................... G09F 1/04
40/124.15
(Continued)

FOREIGN PATENT DOCUMENTS

CN 203192354 U 9/2013
GB 192238 A 2/1923
GB 516656 A 1/1940

OTHER PUBLICATIONS

International Search Report and Written Opinion dated Nov. 12, 2019 for International Patent Application No. PCT/AU2019/051038, 11 pages.
(Continued)

Primary Examiner — Shin H Kim
(74) Attorney, Agent, or Firm — Morgan, Lewis & Bockius LLP

(57) ABSTRACT

A portable temporary road sign structure comprises a sheet material substrate cut into a flat pattern having three interconnected panels: a display panel; a base panel; and a brace panel. The panels are formed to enable deployment into a self-supporting configuration in which the display panel is held upright when the base panel is placed on the ground. For transportation between sites the base and brace panels can be folded flat against the display panel whereby respective handle align for ease of carrying. Various apertures and formations are provided to enable the road sign structure to be held in place, when deployed, by roadside fixtures or weighted bollards.

19 Claims, 21 Drawing Sheets

(51) Int. Cl.
  *B32B 27/32* (2006.01)
  *E01F 9/646* (2016.01)
  *E01F 9/692* (2016.01)
  *G09F 1/00* (2006.01)
  *G09F 1/08* (2006.01)
  *G09F 15/02* (2006.01)
  *G09F 19/00* (2006.01)
  *G09F 7/18* (2006.01)

(52) U.S. Cl.
  CPC ...... *G09F 15/0037* (2013.01); *G09F 15/0062* (2013.01); *B32B 2250/03* (2013.01); *B32B 2250/242* (2013.01); *B32B 2250/40* (2013.01); *B32B 2590/00* (2013.01); *G09F 2007/1878* (2013.01)

(58) Field of Classification Search
  CPC .. G09F 15/0068; G09F 11/00; G09F 15/0006; G09F 15/0062; G09F 5/04; G09F 9/301; G09F 1/04; G09F 1/12; G09F 13/00; G09F 13/20; G09F 2013/1872; G09F 2015/0093; G09F 21/02; G09F 3/204
  See application file for complete search history.

(56) References Cited

U.S. PATENT DOCUMENTS

| | | | | |
|---|---|---|---|---|
| 2,449,911 A * | 9/1948 | Roth | ...... | A47G 1/14 40/539 |
| 2,869,504 A * | 1/1959 | Andrews | ...... | B60Q 7/005 116/63 P |
| 3,007,268 A * | 11/1961 | Atwater, Jr. | ...... | G09F 1/04 40/124.09 |
| 3,470,641 A | 10/1969 | Meyer | | |
| 4,977,697 A | 12/1990 | Genick | | |
| 5,010,669 A * | 4/1991 | Moran | ...... | G09F 1/08 229/92.8 |
| 5,860,237 A * | 1/1999 | Johnson | ...... | G09F 15/0056 40/607.1 |
| 6,035,565 A * | 3/2000 | Capehart | ...... | G09B 3/04 40/594 |
| 6,237,887 B1* | 5/2001 | Banner | ...... | A47B 23/004 248/459 |
| 6,647,652 B1* | 11/2003 | Seiber | ...... | G09F 7/18 434/414 |
| 6,776,117 B2* | 8/2004 | D'Onofrio | ...... | E04H 6/426 116/28 R |
| 7,571,561 B1* | 8/2009 | Garcia | ...... | G09F 19/22 116/63 P |
| 7,823,526 B2* | 11/2010 | Julnes | ...... | E01F 9/688 116/63 P |
| 8,302,551 B2* | 11/2012 | Julnes | ...... | E01F 9/654 116/63 P |
| 10,163,378 B1* | 12/2018 | McGrath | ...... | G09F 15/0062 |
| 2004/0211099 A1 | 10/2004 | Therrell et al. | | |
| 2008/0053942 A1* | 3/2008 | Cox | ...... | G09F 1/065 211/149 |
| 2009/0308303 A1 | 12/2009 | Burlando | | |
| 2010/0319607 A1 | 12/2010 | Julnes | | |
| 2016/0086524 A1* | 3/2016 | Canon | ...... | G09F 19/22 40/538 |
| 2018/0199736 A1* | 7/2018 | Spiro | ...... | A47G 1/101 |
| 2019/0088172 A1* | 3/2019 | McGrath | ...... | G09F 1/065 |
| 2023/0078658 A1* | 3/2023 | Murray | ...... | G09F 7/22 40/587 |

OTHER PUBLICATIONS

1 Extended European Search Report for corresponding European Patent Application No. 19867136.4 dated Sep. 27, 2022, 9 pages.

* cited by examiner

FOLDABLE TEMPORARY AND PORTABLE ROAD SIGN STRUCTURE

CROSS REFERENCE TO RELATED APPLICATIONS

This application is a U.S. National Phase Application of International Application No. PCT/AU2019/051038 filed on Sep. 26, 2019, which claims the benefit of Australian Patent Application No. 2018903647 filed Sep. 27, 2018 entitled "Foldable Temporary and Portable Road Sign Structure", each of which is incorporated by reference herein in its entirety.

FIELD OF INVENTION

This invention generally relates to signage for temporary deployment alongside roadways and the like, and in particular to self-supporting sign panel constructed from foldable sheet material.

BACKGROUND

Conventional temporary roadside signage typically has a four-legged steel frame that supports one or more steel sign panels printed with display indicia. Such conventional temporary roadside signage is robust but is heavy and cumbersome to deploy and move from place to place.

Accordingly, it is desirable to design and develop a temporary portable roadside signage structure that is simple and inexpensive in construction and is capable of being quickly and easily stored, transported and deployed.

SUMMARY

The present invention provides a temporary road sign structure comprising a sheet material substrate cut into a flat pattern having three interconnected panels: a display panel; a base panel; and a brace panel; the display panel and brace panel each being connected to the base panel at opposite edges thereof defined by first and second parallel hinge lines, wherein the extent of the display panel orthogonal to the first hinge line is substantially equal to the combined extent of the base panel and brace panel, and wherein the end of the brace panel opposite the second hinge line is adapted to engage with the display panel, in use, to form a self-supporting structure in which the display panel is held upright when the base panel is placed on the ground.

The first and second hinge lines may be formed by creases in the sheet material substrate to allow or facilitate relative articulation of the respective panels. When the road sign structure is deployed to form a self-supporting structure the display panel is articulated about the first hinge line so as to be approximately orthogonal to the base panel, and the brace panel is articulated about the second hinge line to form an acute angle between the base panel and the brace panel toward its engagement with the display panel.

The brace panel may be constructed to releasably engage with the display panel by means of a number of different structures and/or devices. In one form of the invention the end of the brace panel opposite the second hinge line is provided with one or more tabs, tongues or flanges constructed to, in use, be inserted into or through a slit or slot formed in the display panel to create an interference fit engagement. In one form of the invention the slit or slot is linear and substantially parallel to the first and second hinge lines. In another form of the invention the slit or slot is formed with a curved profile, preferably in a shallow arc having ends curved toward the first hinge line.

The brace panel may be formed with a generally central aperture adapted to accommodate the post of a portable bollard. This allows a bollard to be incorporated into the road sign structure when deployed, with a weighted base of the bollard sitting on the base panel of the road sign structure substantially within the region bounded by the base panel, brace panel and display panel, and the bollard post extending through said aperture. In use the weighted base of the bollard thus anchors the signage structure in place.

Sets of corresponding apertures may be formed to each or either side of the base panel and top edge of the display panel for use in securing the signage structure to a roadside guide post or the like. In use, the signage structure may be placed over the guide post so as to extend through the corresponding apertures on the base panel and display panel. For this purpose the display panel may be arranged or flexed backwardly to a sufficient degree that the vertical guide post can extend through both the base panel and display panel apertures.

Preferably the display panel and the brace panel are each provided with respective handle apertures or fitments towards their opposed edges, wherein the respective handle apertures or fitments substantially align with one another when the display panel is folded over along the first hinge line relative to the base panel and brace panel to as to configure the road sign structure for transportation and/or storage.

The substrate used to faun the flat pattern may comprise a polypropylene sheet material, or other polymer, fibre and/or composite sheet material of suitable rigidity for maintaining a self-supporting configuration while also capable of being bent to articulate the panels relative to one another at the hinge lines. The substrate may be creased or partially slit along the hinge lines to assist the flat pattern being bent into each of the deployed and transport configurations.

The display panel may be printed with indicia for use as roadside signage display, or the display panel may be provided with apertures, clips or other fitments for permanently or temporarily attaching separate printed indicia sheet panels.

The invention also provides a method of forming, transporting and deploying a temporary road signage structure, including: forming a sheet material substrate into a flat pattern having three interconnected panels comprising a display panel, a base panel, and a brace panel, the display panel and brace panel each being connected to the base panel at opposite edges thereof defined by first and second parallel hinge lines, wherein the extent of the display panel orthogonal to the first hinge line is substantially equal to the combined extent of the base panel and brace panel, and wherein the end of the brace panel opposite the second hinge line is adapted to engage with the display panel, in use, to form a self-supporting structure in which the display panel is held upright when the base panel is placed on the ground; configuring the road signage structure into a transportation configuration wherein the display panel is folded onto the base panel and brace panel about the first hinge line; carrying the road signage structure to a desired location; and deploying the road signage structure by configuring it into said self-supporting structure.

Further aspects, features and advantages of the present invention will be apparent to those of ordinary skill in the art from the accompanying description and drawings.

BRIEF DESCRIPTION OF DRAWINGS

In order that the invention may be more easily understood, the following detailed description is provided including description of embodiments of the invention, presented by way of example only, and with reference to the accompanying drawings in which.

DETAILED DESCRIPTION

A portable signage structure 10 for temporary deployment alongside roadways and the like is shown in the Figures and described hereinbelow. The signage structure is formed from sheet material and comprises three interconnected panels: a display panel 20, a base panel 30 and a brace panel 40. The display panel 20 and the brace panel 40 are each connected to the base panel 30 at opposite edges thereof defined by panel hinge lines 32, 34. The hinge lines 32, 34 are parallel to one another and may be formed by creases in the sheet material to allow or facilitate relative articulation of the respective panels.

Figure 8:
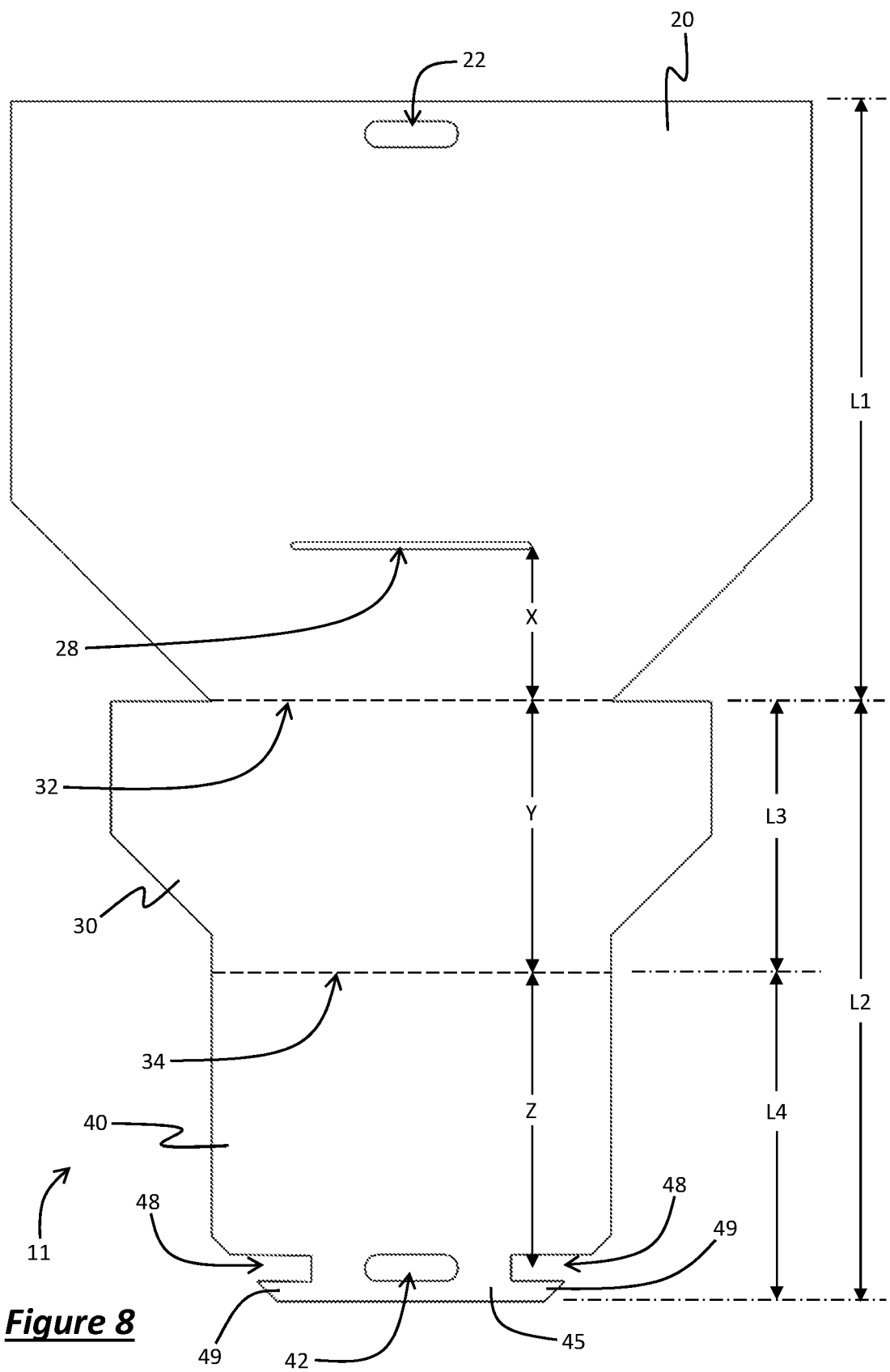
FIG. 8 is a plan view of a sheet material cut-out shape for a road sign according to an embodiment of the invention.
Figure 12:
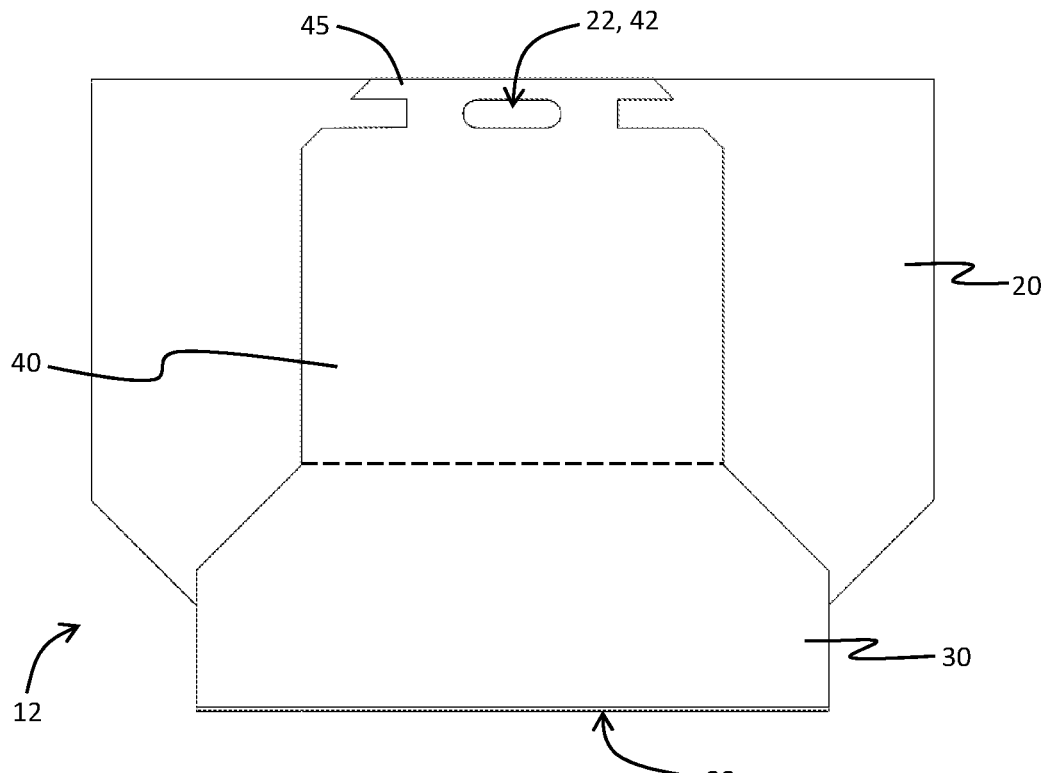
FIGS. 12 and 13 are plan and perspective views, respectively, of the road sign folded into a transportable configuration.
Figure 13:
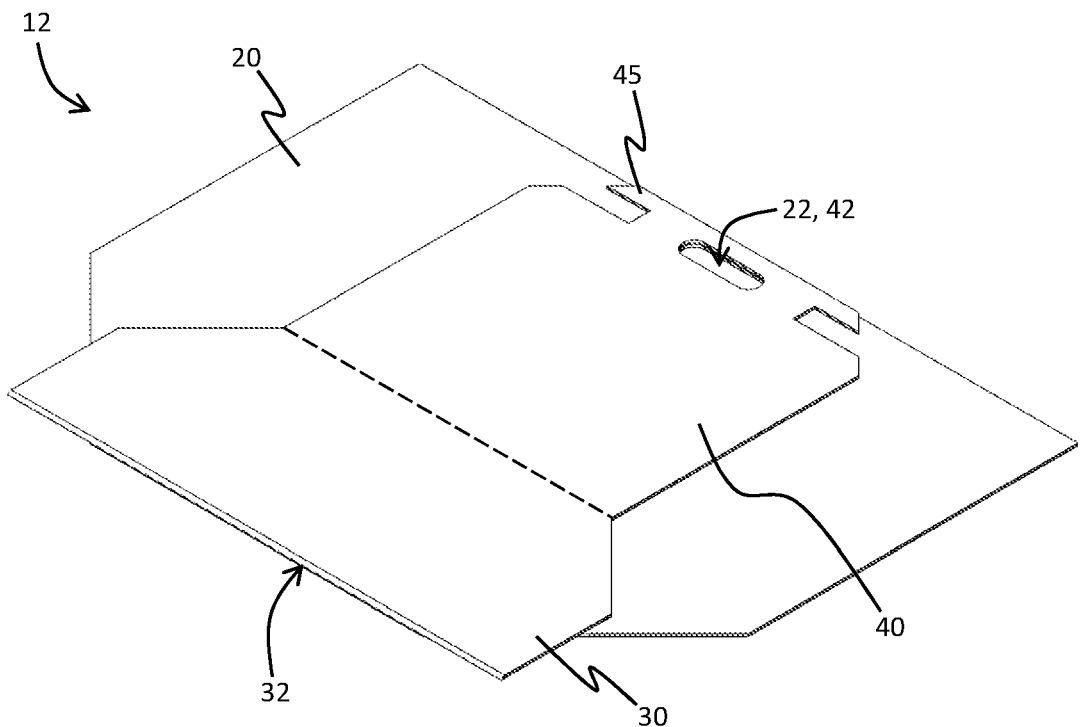
Figure 14:
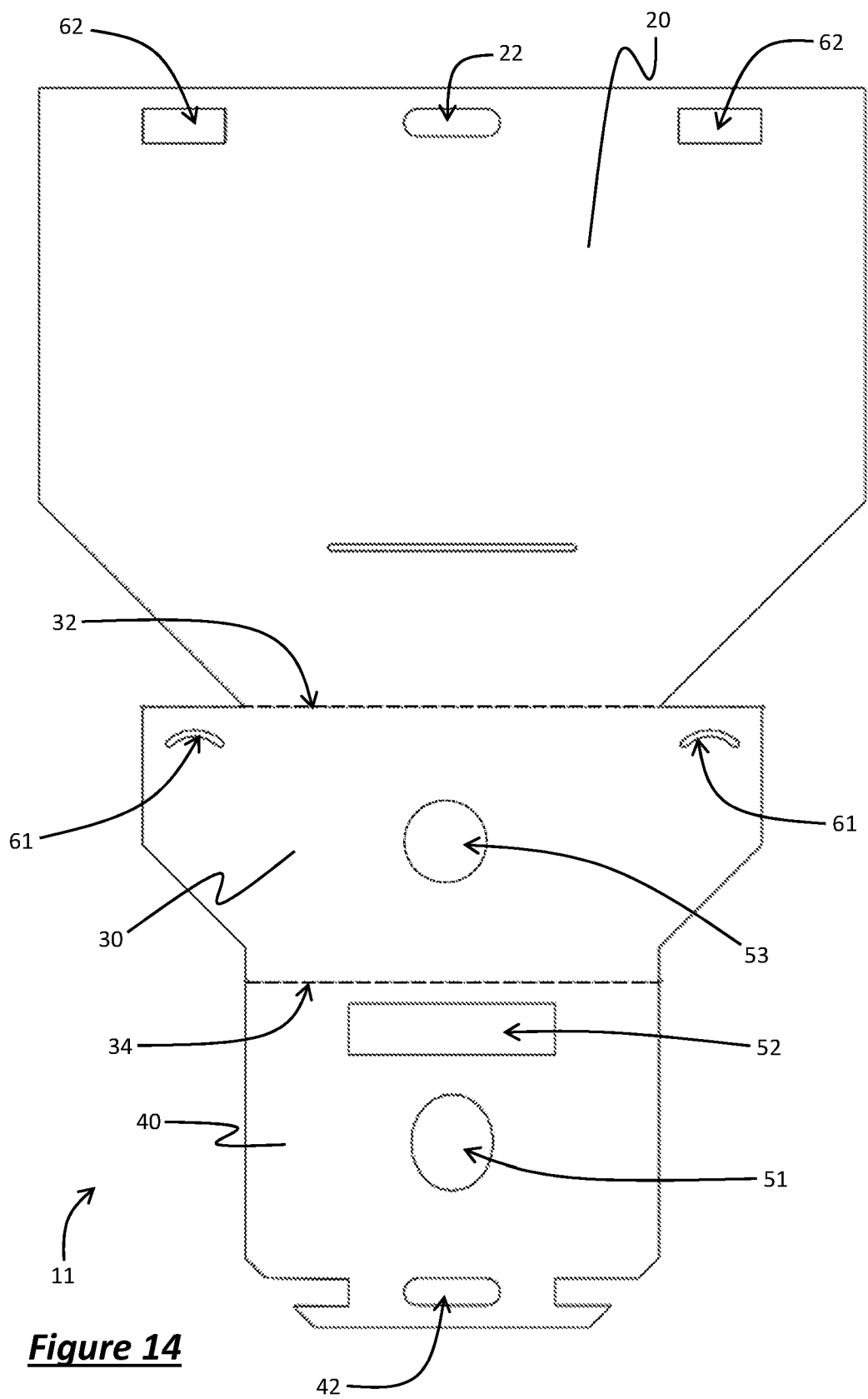
FIGS. 14 and 15 illustrate a sheet material cut-out shape for a road sign according to a second embodiment of the invention, seen in plan view and perspective view respectively.
Figure 15:
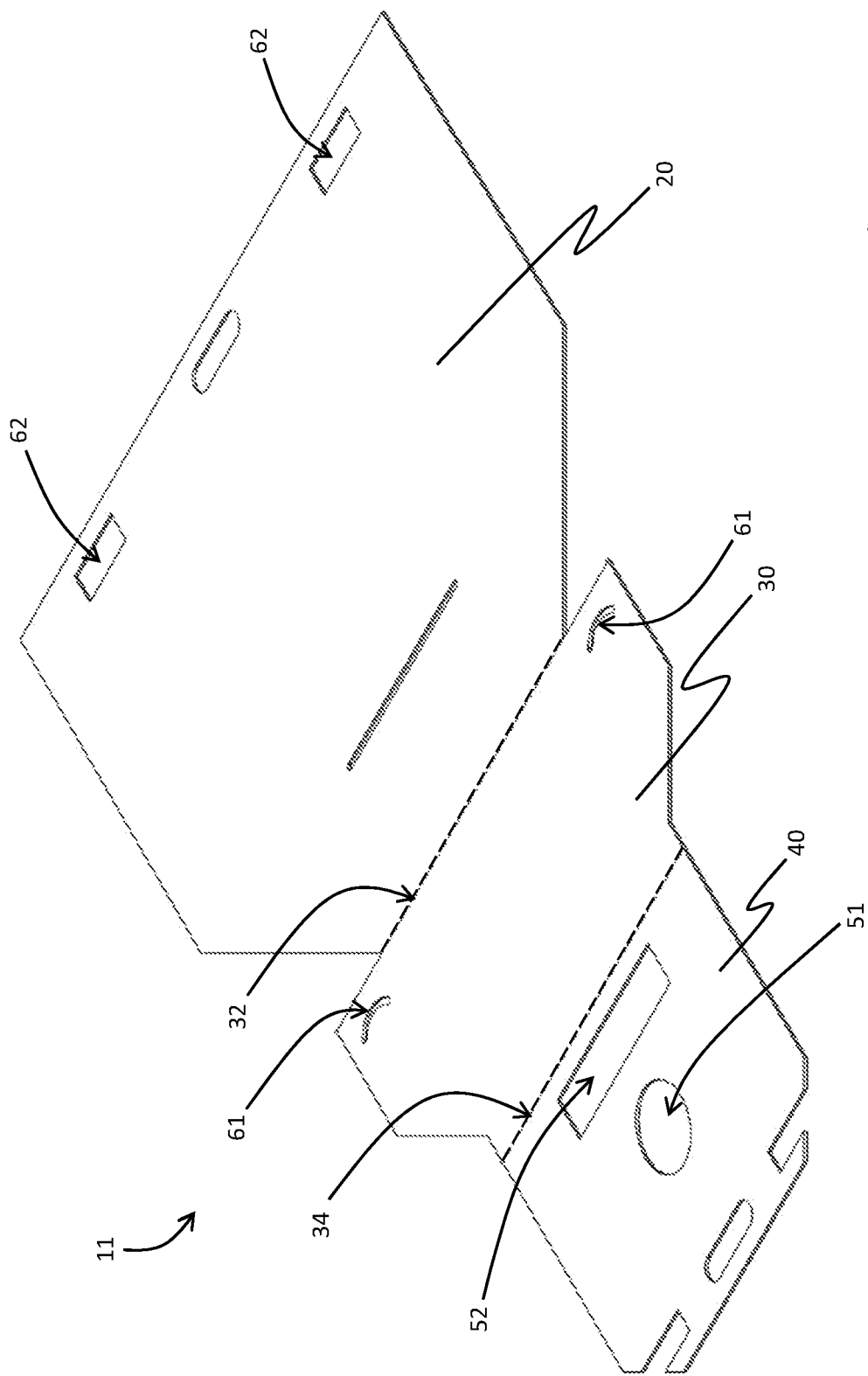
Figure 16:
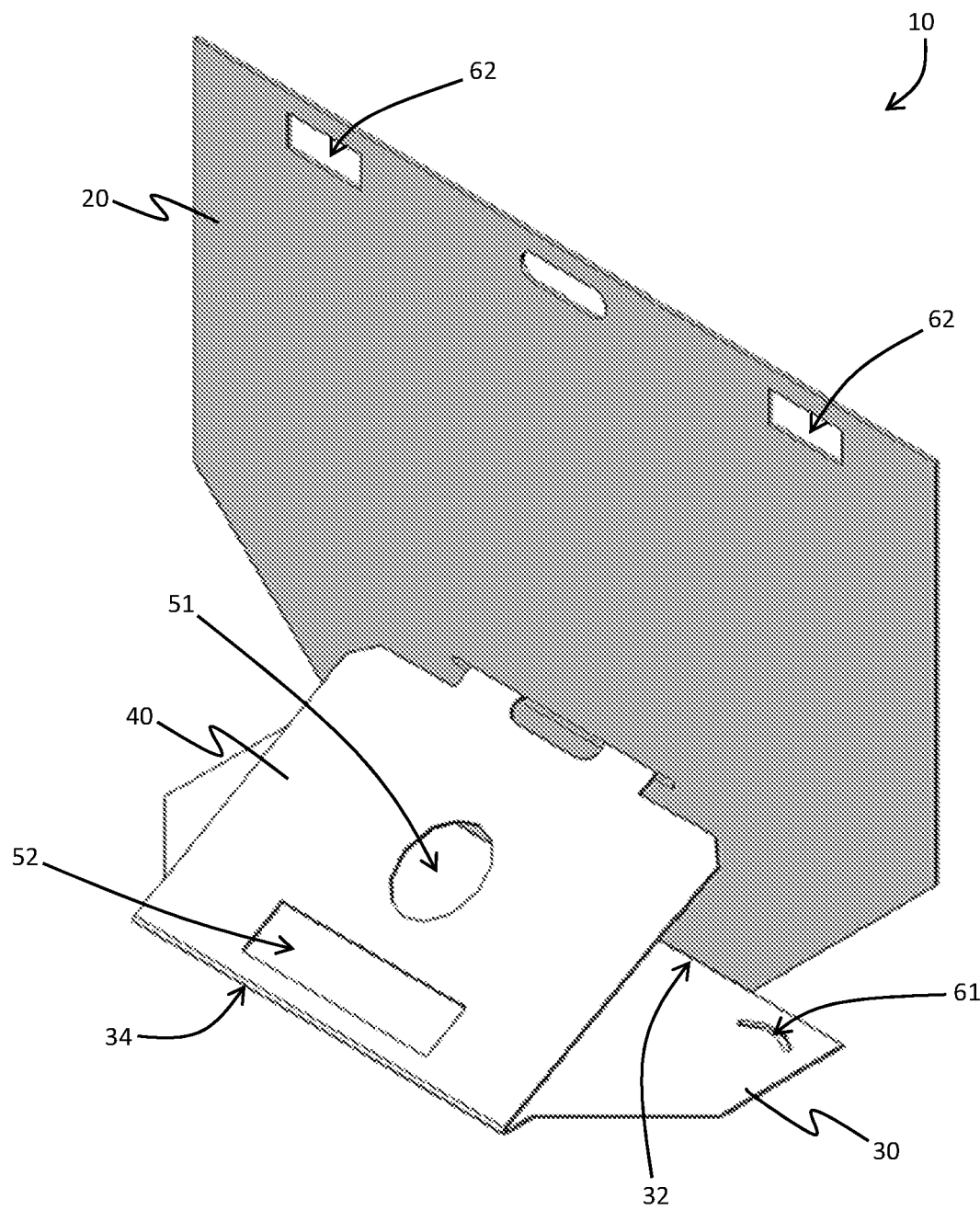
FIG. 16 is a rear-overhead perspective view of the road sign of the second embodiment in deployed configuration.
Figure 17:
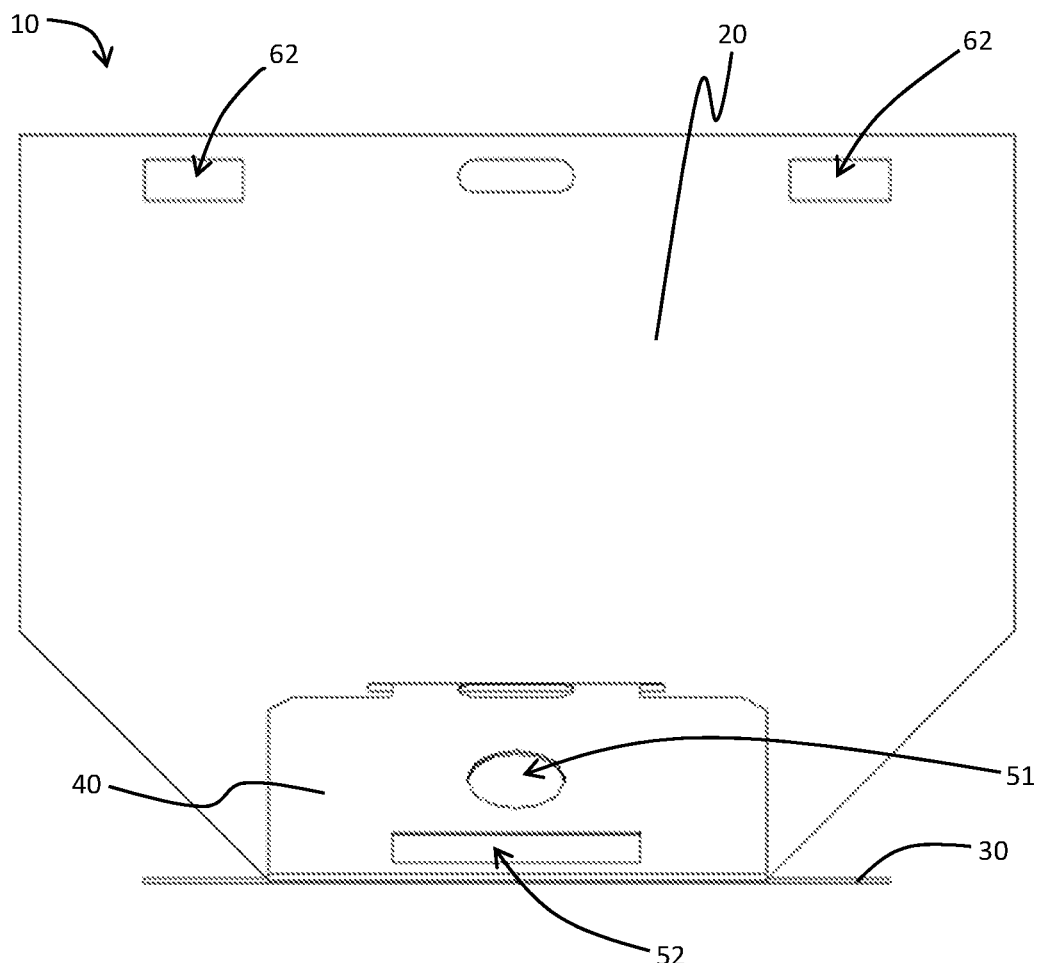
FIG. 17 is a rear elevation view of the road sign of the second embodiment in deployed configuration.
Figure 18:
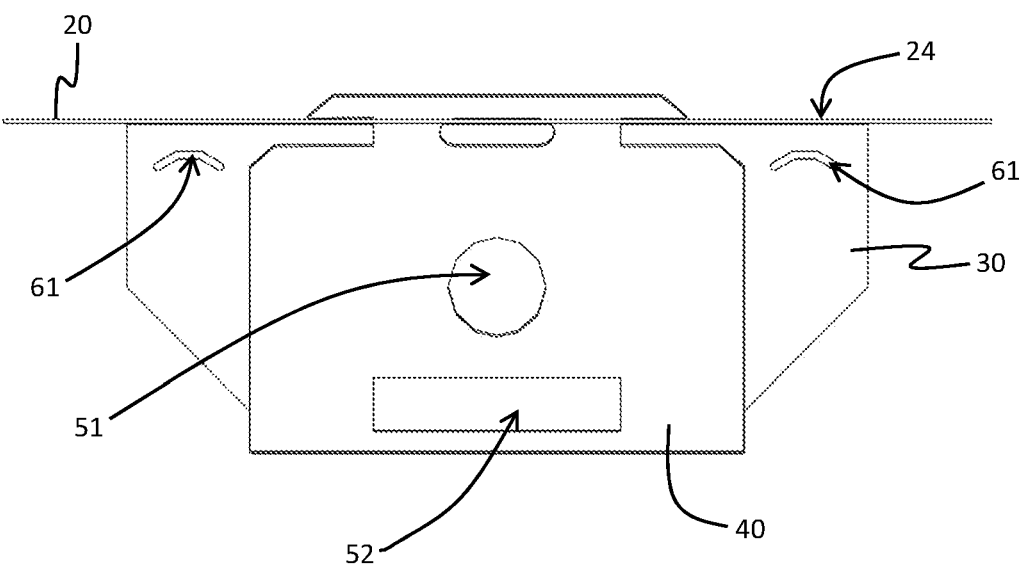
FIG. 18 is an overhead view of the road sign of the second embodiment in deployed configuration.

The signage structure may be formed from a flat pattern 11 cut from a sheet material substrate, an example of which is shown in FIG. 8. The display panel 20 has the largest area and is generally rectangular with a tapering section toward its connection to the base panel 30 at hinge line 32. The base panel 30 has a lesser width than the display panel but is greater in width than the tapered end thereof. The base panel also tapers toward its connection to the brace panel 40 at hinge line 34. The brace panel 40 has the width of the tapered end of the base panel 30, which is approximately the same width as the tapered end of the display panel 20. The brace panel 40 has a tapered end 45 which is formed with opposed lateral slots 48 that create a pair of lateral tabs or flanges 49. The flat pattern 11 has handle apertures 22, 42 formed adjacent the opposed respective ends of the display panel 20 and brace panel 40, the handle aperture 42 being located generally between the slots forming the tabs or flanges 49. The display panel also has a slot or slit 28 extending generally parallel to the hinge lines 32, 34, the width of which is marginally less than the width across the end 45 of the brace panel. The length 'L1' of the display panel 20 is substantially equal to the combined lengths 'L2' of the base panel 30 ('L3') and brace panel 40 ('L4'), making the hinge line 32 central and transverse along the length of the flat pattern 11. This arrangement allows the flat pattern 11 to be folded in two at the hinge line 32 whereby the end edges of the display panel 20 and brace panel 40 align, bringing into alignment the two handle apertures 22, 42. Such a configuration 12 is shown in FIGS. 12 and 13, and is adapted for transportation and storage of the signage structure. In particular, the transport and storage configuration 12 is flat, having a thickness roughly twice that of the sheet material making it suited for easy and low-volume storage, whilst the aligned handle apertures 22, 42 allow the item to be readily grasped and carried by a user, in singular or in multiple numbers.

The relative lengths of the base panel 30 and the brace panel 40 are chosen in conjunction with the distance between the hinge line 32 and slot or slit 28 on the display panel 20. More specifically, the relative lengths X (between the slot 28 and the hinge line 32), Y (between the hinge line 32 and hinge line 34) and Z (between the hinge line 34 and the slots 48) are selected to form a right triangle when the signage structure is assembled into its deployment configuration 10 (best seen in FIG. 2, for example). In other words, by selecting the lengths X, Y and Z such that $X^2+Y^2 \approx Z^2$, when assembled the panels will form a structure wherein the display panel 20 will be upright when the base panel 30 rests on the ground, stabilised by the brace panel 40.

The signage structure 10 seen in its assembled deployment configuration is shown in various views in FIGS. 1 to 5. In this configuration the display panel 20 extends substantially orthogonal to the base panel 30 and held in position by the brace panel 40, the end 45 of which engages in the slot 28 of the display panel to hold the structure in place. Specifically, when so configured the hinged connection 34 between the base panel 30 and the brace panel 40 forms an acute angle and the slots 48 of the brace panel inter-engage with the slot 28 of the display portion. In the assembled structure the tabs 49 on the end 45 of the brace panel project through the slot 28 to the front of the display panel, as seen particularly in FIGS. 1, 2 and 5.

Figure 9:
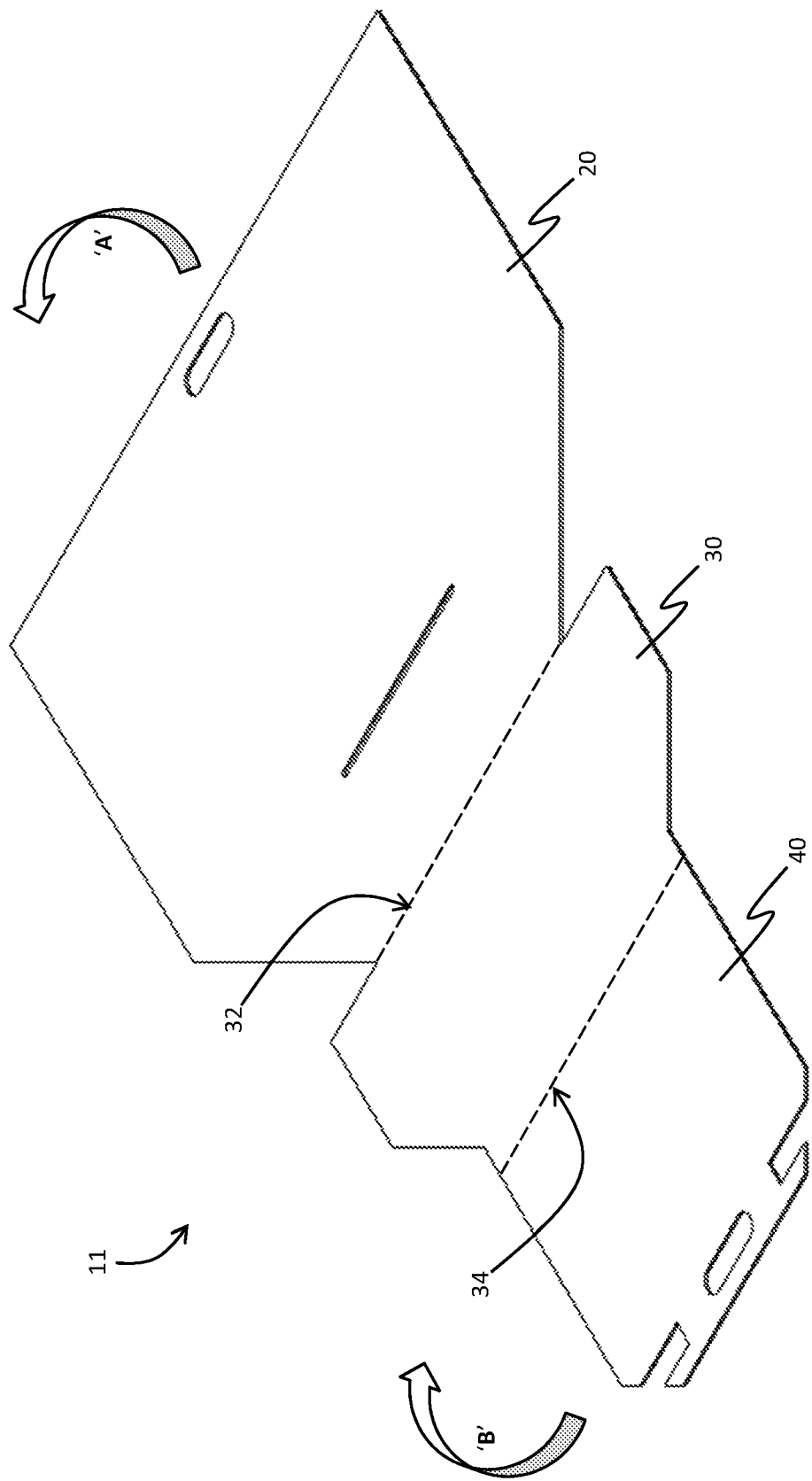
FIG. 9 is a perspective view of the sheet material cut-out indicating folding of the pattern from flat to deployed configurations.
Figure 10:
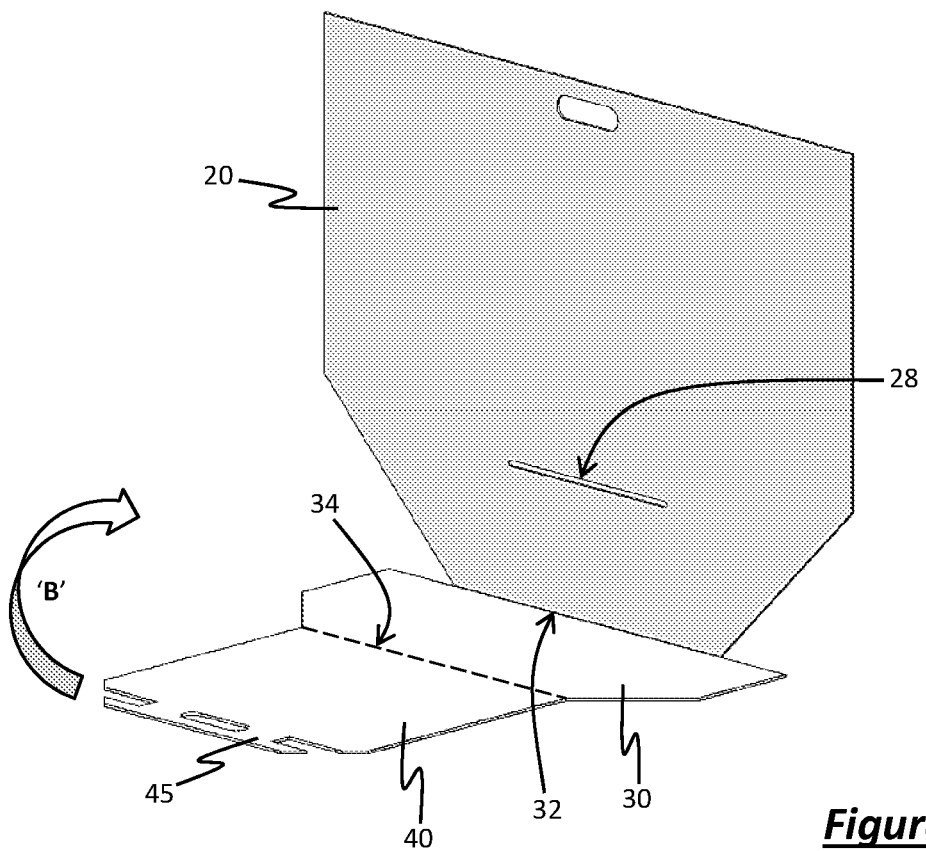
FIGS. 10 and 11 are rear perspective views illustrating the folding and deployment procedure.
Figure 11:
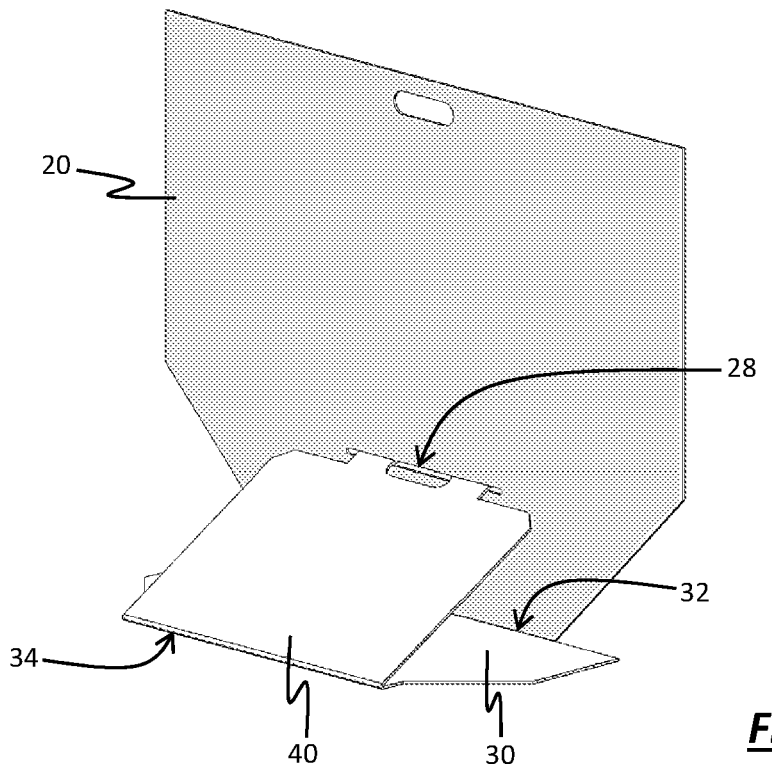

Assembly of the signage structure 10 from the flat pattern state 11 is illustrated in FIGS. 9, 10 and 11. Referring to FIG. 9, the process involves bending the flat pattern sheet material along the hinge lines 32 and 34 as indicated diagrammatically by arrows 'A' and 'B'. Specifically the display panel 20 and brace panel 40 are pivoted relative to the base panel 30 along the hinge lines 32, 34 respectively. To facilitate this operation the flat pattern sheet material may be creased or otherwise pre-prepared to bend along the hinge lines 32, 34. FIG. 10 shows a first operation wherein the display panel is pivoted relative orthogonal to the base panel 30. FIG. 11 shows the deployed configuration of the signage structure 10 from the rear wherein the brace panel 40 has been pivoted relative to the base panel and engaged with the display panel. Engagement of the brace panel with the display panel involves inserting the tabs 49 on the end 45 of the brace panel through the slot 28 in the display panel by flexing or other manipulation of the sheet material wherein an interference fit is formed between the margins of the slots 48 and the margins of the slot 28. The signage structure 10 may be readily disassembled in reverse manner to return to a flat state or be configured for transportation and storage as previously described.

Figure 1:
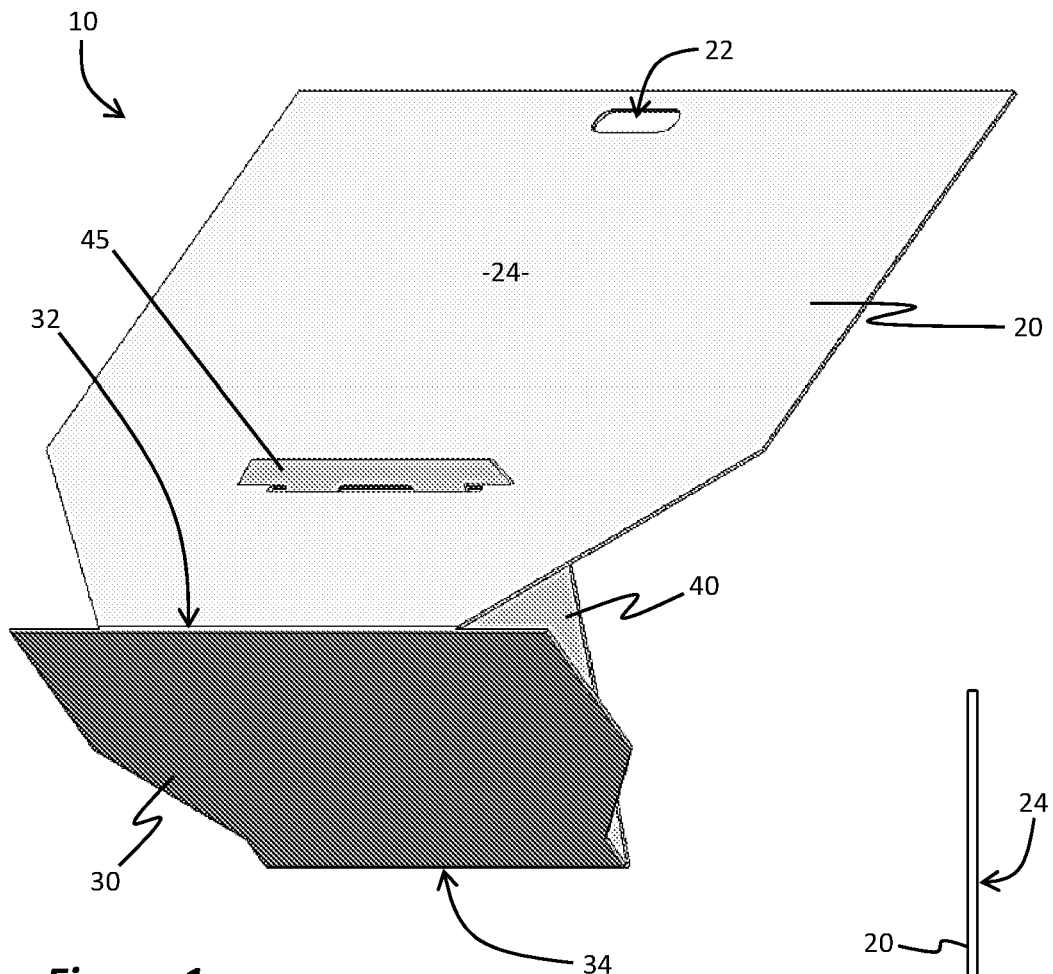
FIG. 1 is a front-underside perspective view of a portable temporary road sign according to an embodiment of the invention, in deployed configuration.
Figure 2:
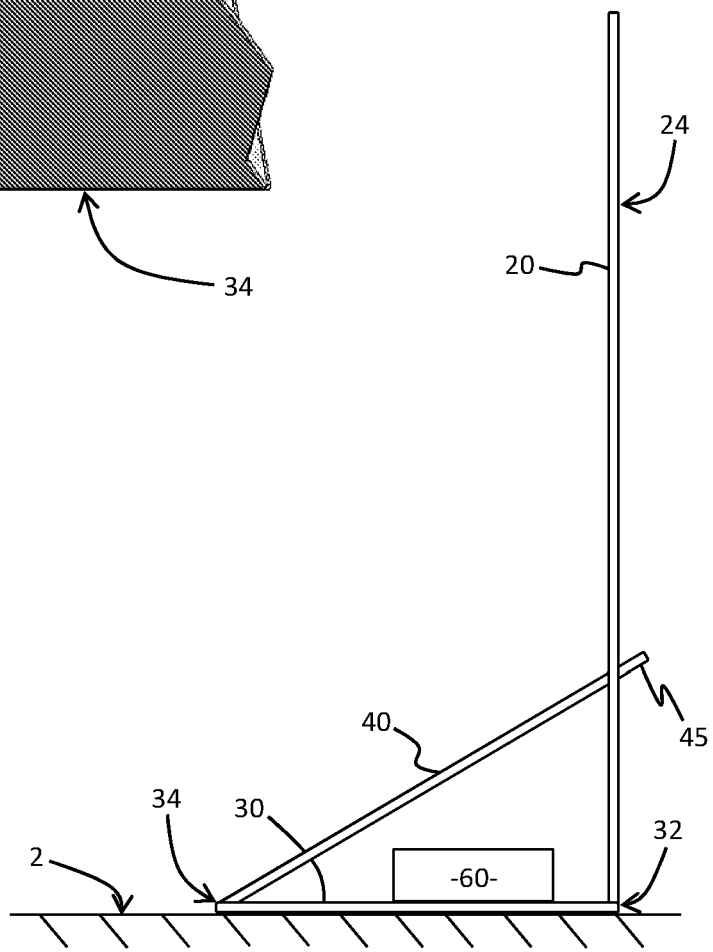
FIG. 2 is a side elevation view of the road sign in deployed configuration.
Figure 3:
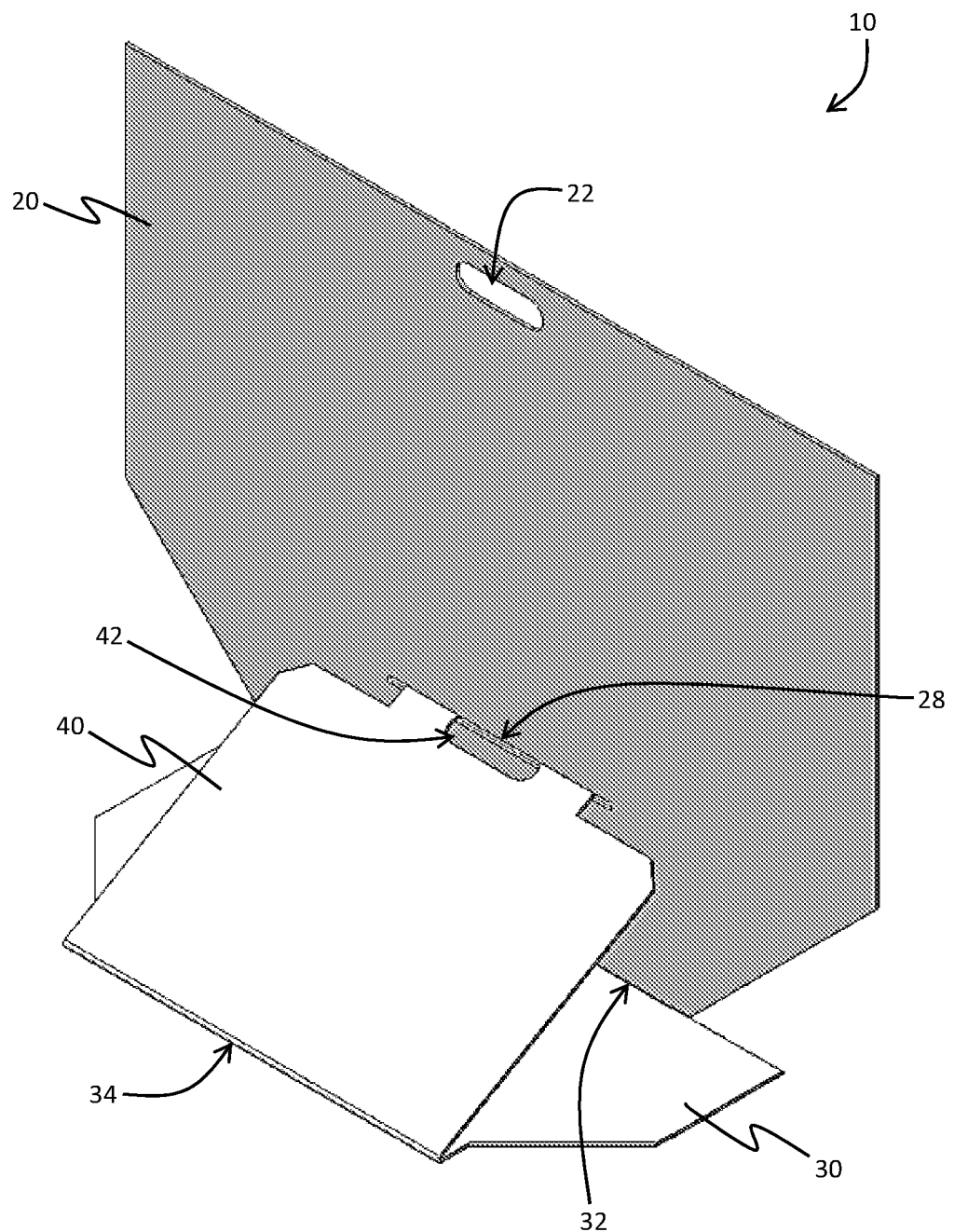
FIG. 3 is a rear-overhead perspective view of the road sign in deployed configuration.
Figure 4:
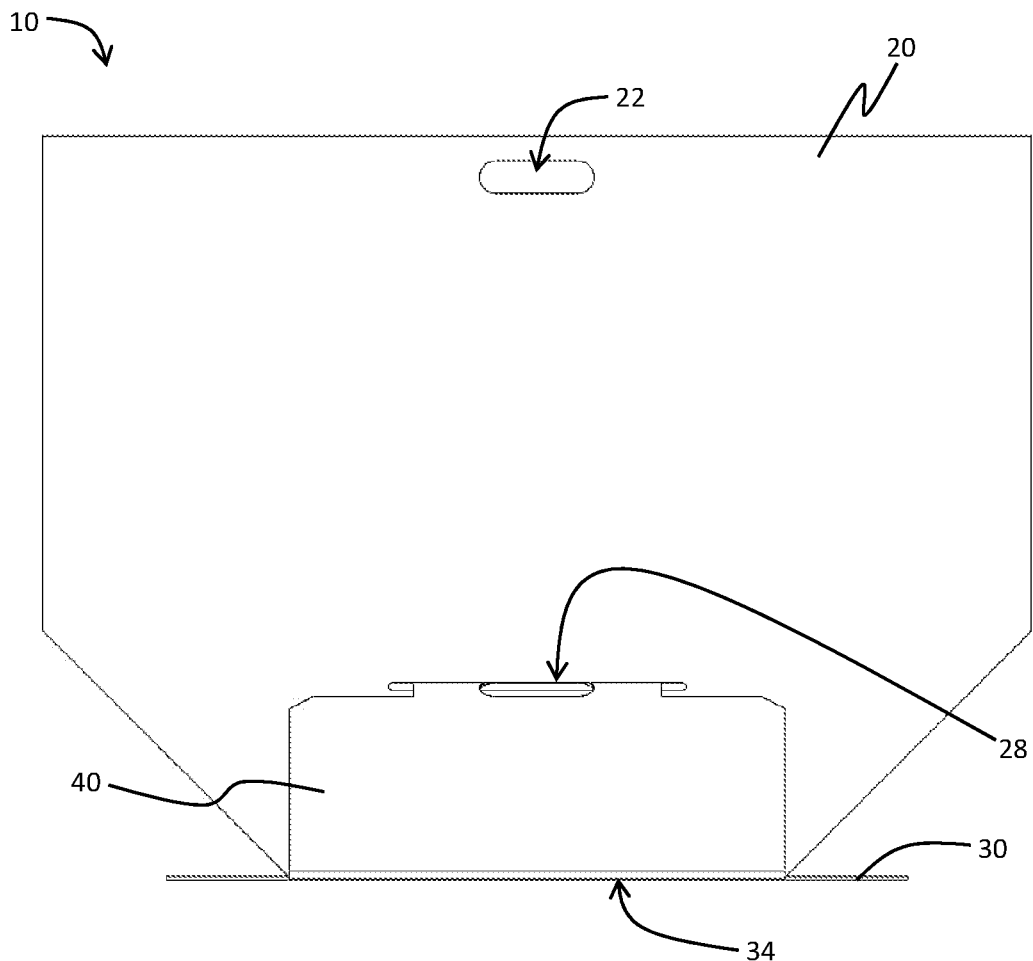
FIG. 4 is a rear elevation view of the road sign in deployed configuration.
Figure 5:
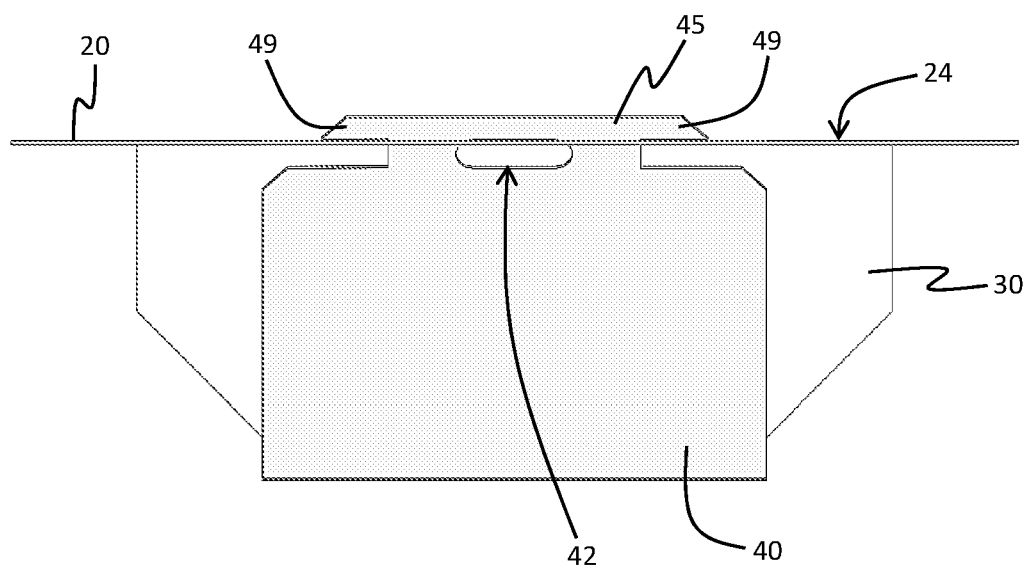
FIG. 5 is an overhead view of the road sign in deployed configuration.
Figure 6:
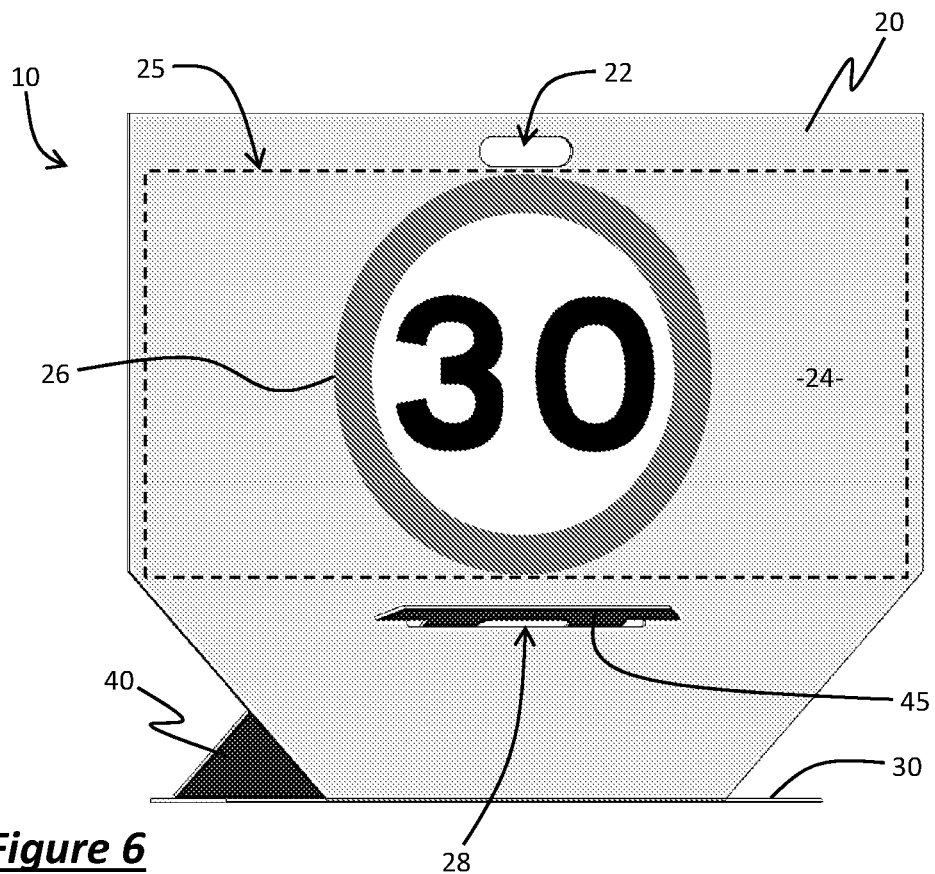
FIGS. 6 and 7 are front angles and plane-elevation views, respectively, of the road sign in deployed configuration illustrating signage display.
Figure 7:
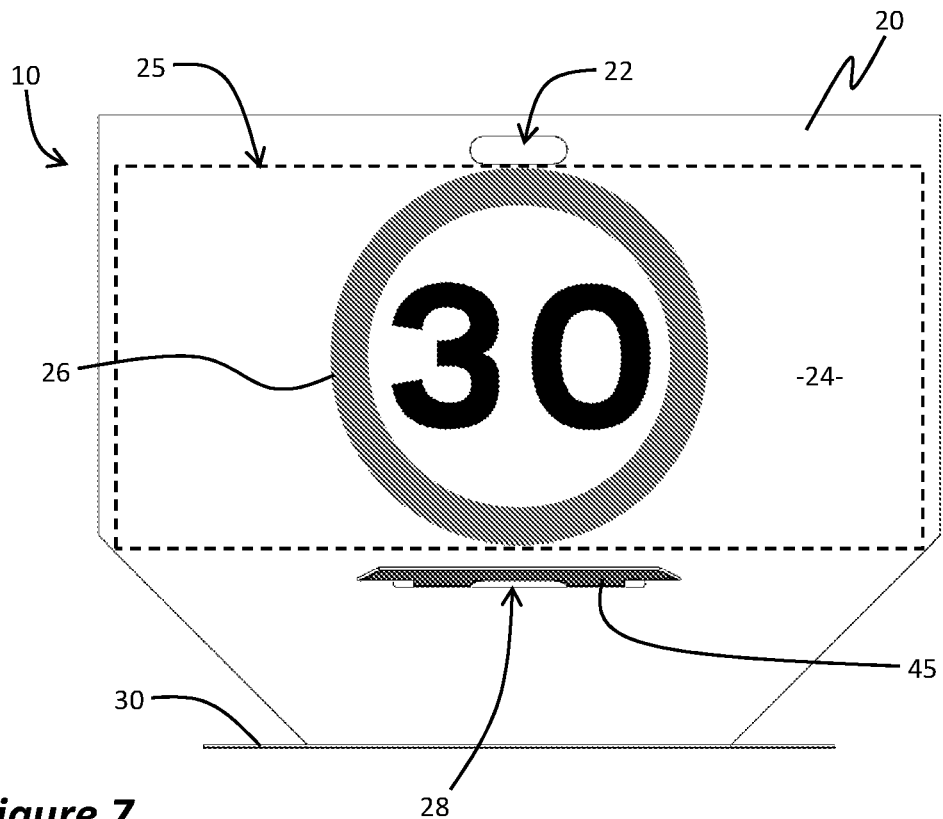

When the signage structure 10 is deployed it may be set to rest on a ground surface 2 such as illustrated in FIG. 2, wherein a front surface 24 of the display panel 20 is positioned upright and adapted for displaying temporary roadside signage indicia, such as altered road or speed conditions for example. FIGS. 6 and 7 show the signage structure 10 including such indicia 26, which may be printed directly on the front surface 24 of the display panel 20, or may be printed on separate sheet material that is permanently or temporarily bonded or otherwise attached to the display panel for the purpose at hand. Various types of temporary or permanent attachment means such as clips, rivets and the like may be employed for this purpose. The reverse side of the display panel 20 may also carry signage indicia, which may be the same or different than the indicia on the front.

When the signage structure 10 is deployed it may be advantageous to hold it in place against wind force and the like by use of a weight (e.g. weighted block 60 seen in FIG. 2) which can be accommodated within the triangular cavity formed between the assembled panels. The weight may be a separated component or may be incorporated in or attached to the signage structure. The signage structure seen in various embodiments herein has been specifically designed to be ballasted by an octagonal shaped rubber or plastic disk, 400 mm nominal size. These items are commonly used as bases to "T-top" bollard delineators and can be employed as ballast to the signage structure with or without the vertical post component of the bollard.

FIGS. 14 to 21 show the signage structure 10 and corresponding flat pattern 11 incorporating additional features designed for convenient stabilization of the signage structure, when deployed, using readily available roadside infrastructure or common equipment. In particular, the embodiment shown in FIGS. 14 to 21 includes two sets of additional apertures that are designed to accommodate roadside fixtures or portable bollards to hold the signage structure in place when deployed.

Figure 19:
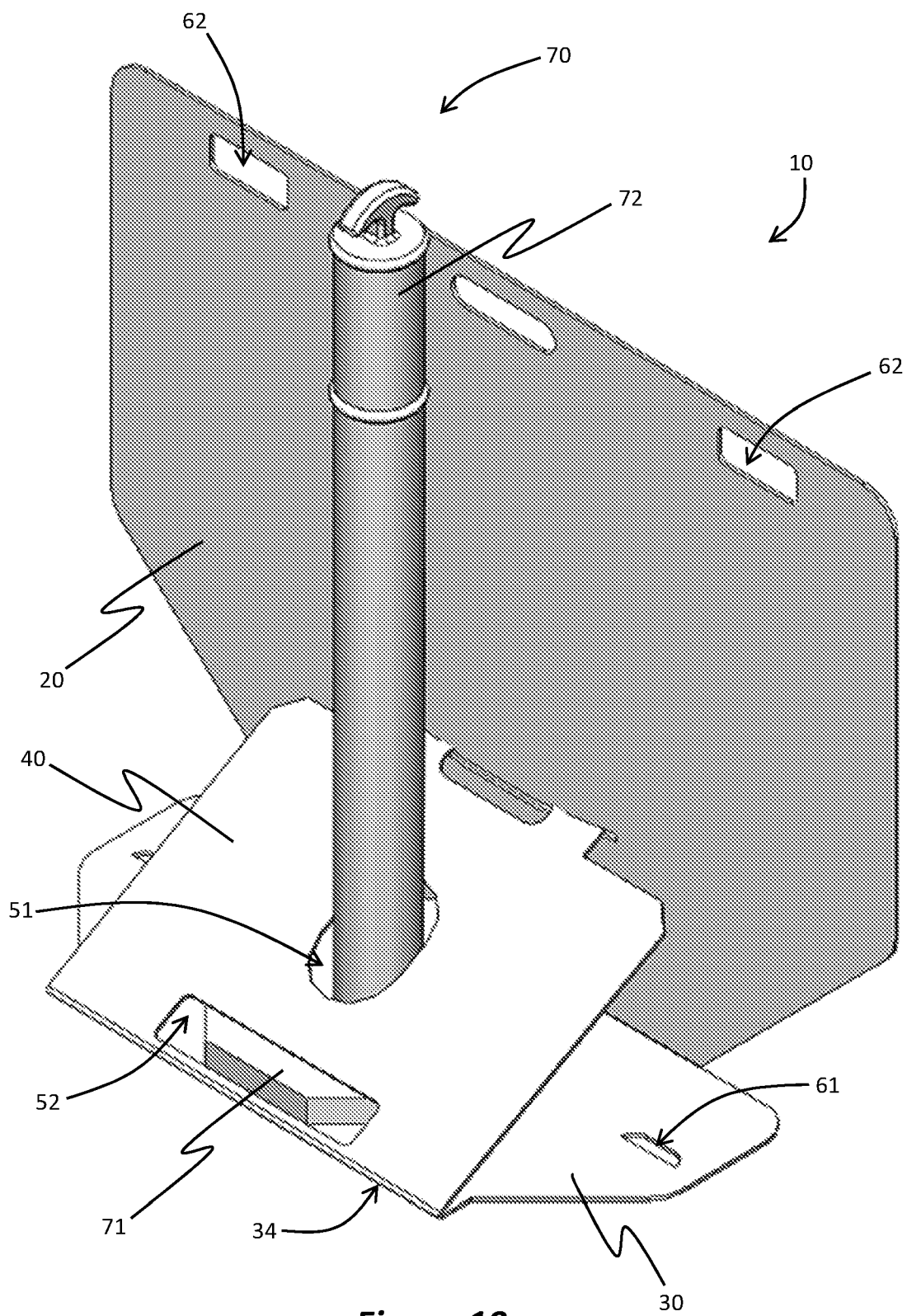
FIG. 19 is a rear-overhead perspective view of the road sign of the second embodiment in deployed configuration together with a portable weighted bollard.
Figure 20:
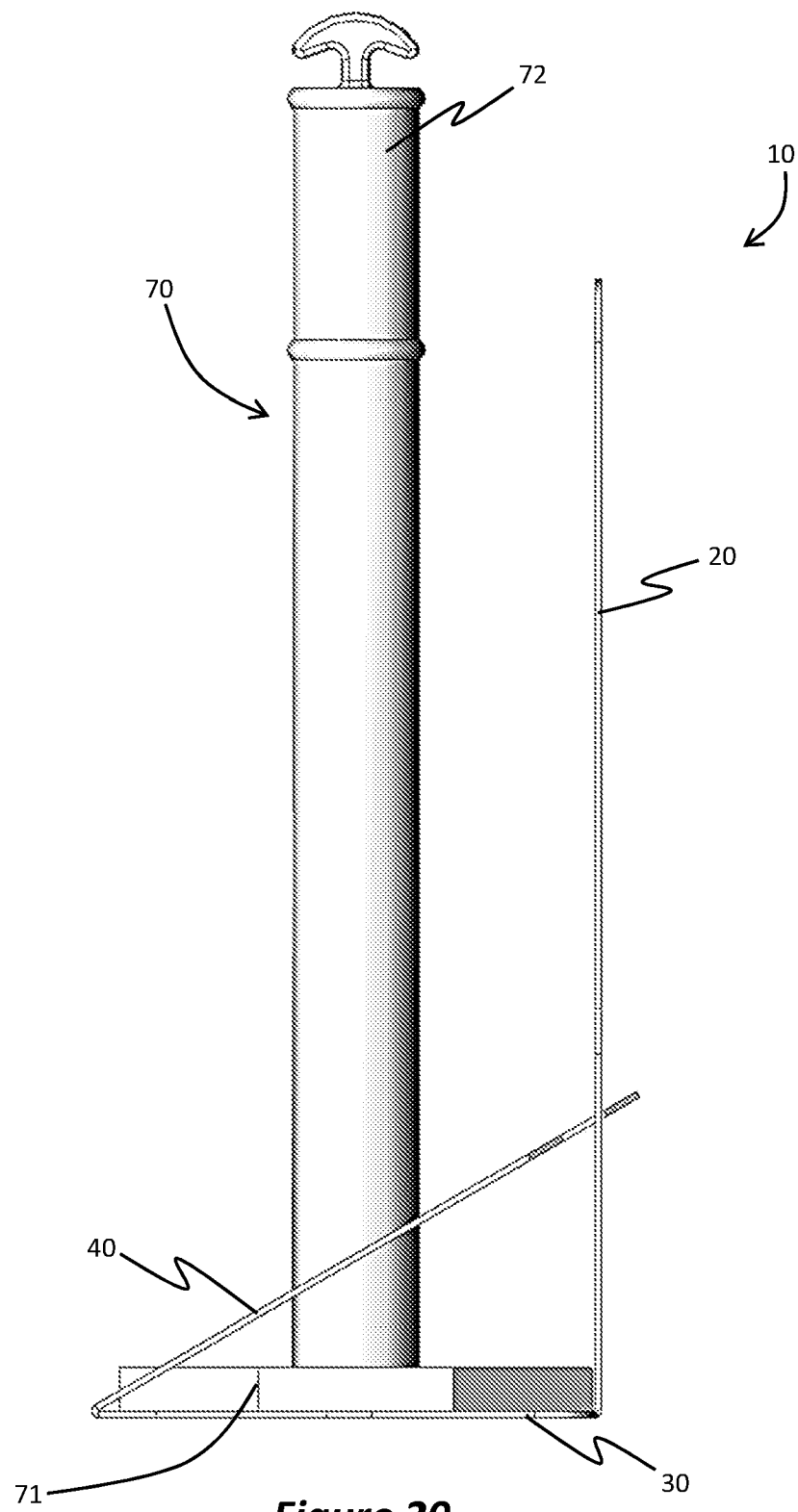
FIG. 20 is a side view of the road sign and bollard of FIG. 19.
Figure 21:
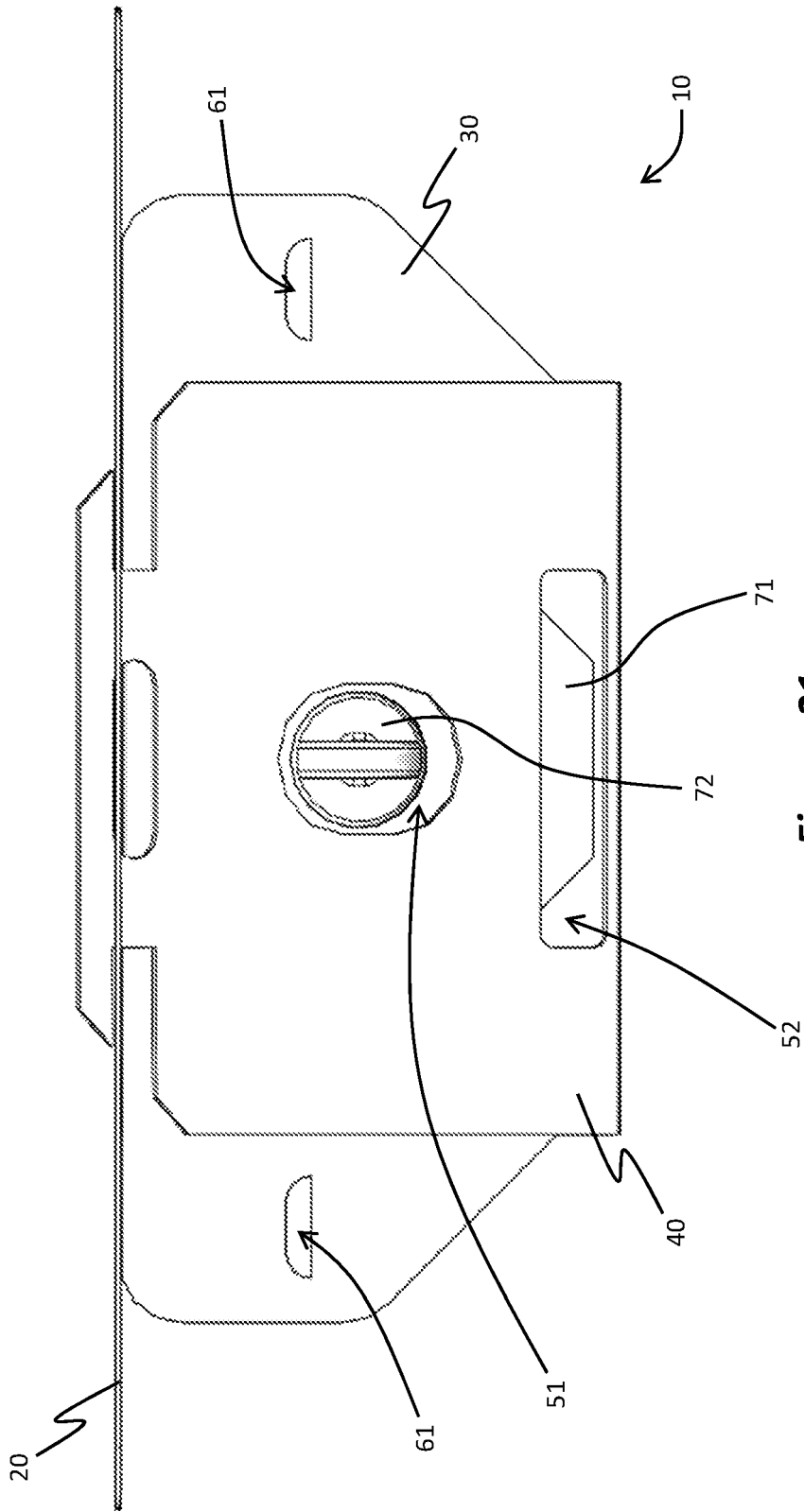
FIG. 21 is an overhead view of the road sign and bollard of FIG. 19.

A first additional set of apertures 51, 52 included in second embodiment is provided to accommodate a portable weighted bollard 70 within the signage structure 10. As seen in FIGS. 19, 20 and 21 a portable bollard 70 of the kind typically used on roadsides and elsewhere has a weighted base 71 supporting an upstanding post 72. The apertures 51, 52 are designed to enable such a bollard 70 to be incorporated into the structure of the signage 10, whereby the weighted base 71 of the bollard sits on top of the base panel 30, with the upstanding post 72 projecting through the aperture 51 which is formed centrally in the brace panel 40. The other aperture 52 is formed in the brace panel 40 adjacent its union with the base panel 30, to allow for the thickness of the bollard base 71, when in situ, not to impinge upon the angled brace panel of the deployed signage structure 10. When a bollard 70 is arranged into the deployed signage structure 10 as seen in FIGS. 19-21 the weight of the bollard base 71 acts to hold the sign in place, and the upright post 72 may supply additional stability to the display panel 20, at least insofar as providing a limit to the extent by which the display panel can flex backwardly under wind load or the like.

A further aperture 53 (location shown in dotted lines in FIG. 14) may optionally be provided in the centre of the base panel 30, corresponding in vertical alignment with the aperture 51 when the sign is in its deployed configuration. This would enable the signage structure to be placed directly over the upstanding post of a bollard or the like, without the bollard base being incorporated into the structure as described above. In this case the upstanding post of the bollard or the like would project though both apertures 53 and 51, and additional or alternative weighting or other securing features may be used to hold the signage structure in a desired orientation, if necessary.

A second additional set of apertures 61, 62 are included in the second embodiment so that the signage structure can be placed over a fixed roadside guide post or similar fixture. Such roadside guide posts may typically be formed from plastic or metal and fixed to the roadside, providing a visual indication to vehicular traffic of the road verge. The apertures 61, 62 are design to allow the signage structure 11 to be placed onto such a guide post, such that the guide post projects up through an aperture 61 formed in a forward corner of the base panel 30 and also through a corresponding aperture 62 formed in the upper edge of the display panel 20. In order to allow the guide post to extend through both apertures 61, 62 it may be necessary for one of the panels to flex somewhat, or for the dimensions of the signage structure and corresponding flat pattern to be selected so that the display panel 20, when deployed, leans backward to some degree. A set of apertures 61, 62 may be provided to each side of the sign although typically only one set would be in use at a given time.

Figure 22:
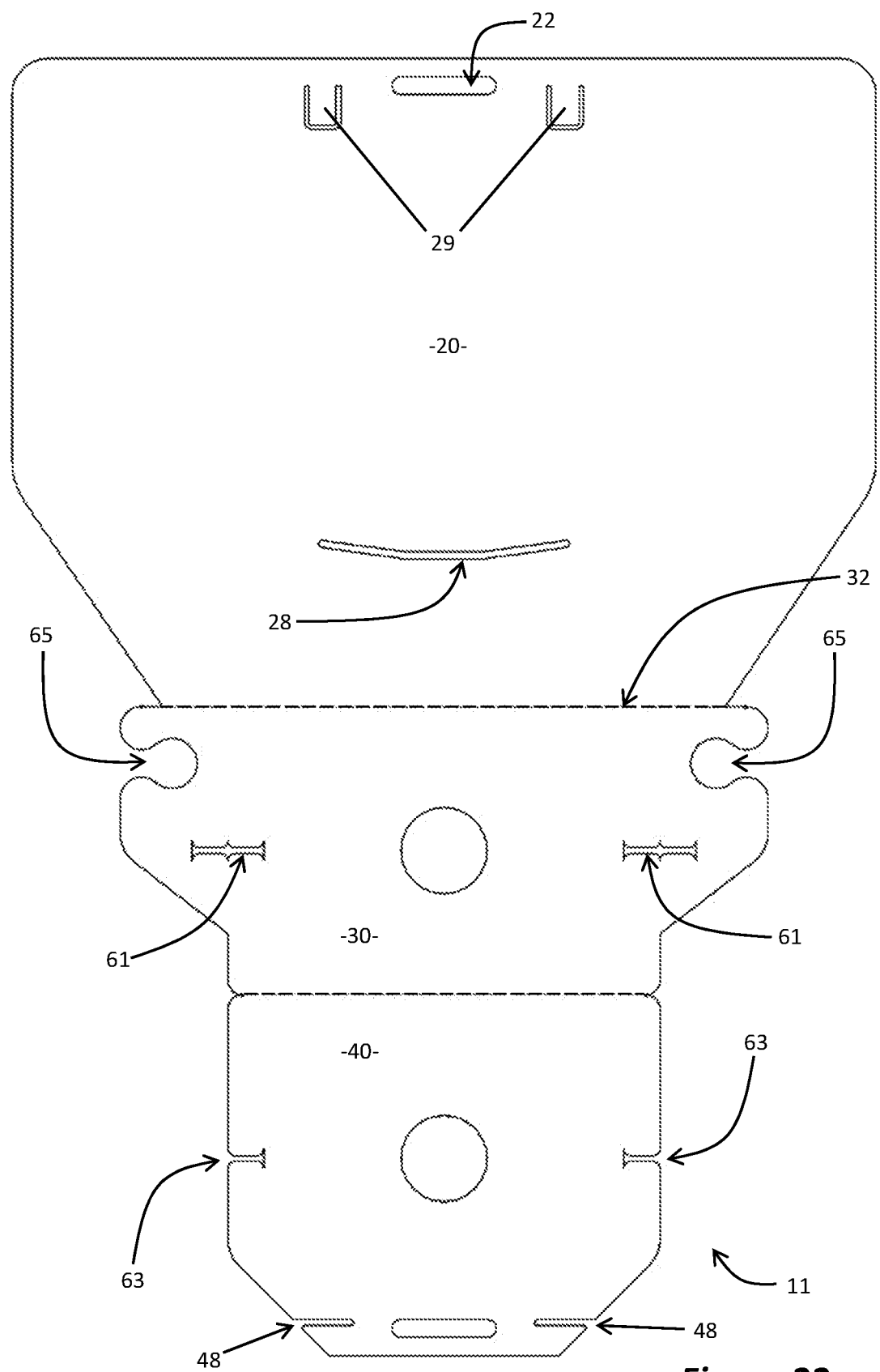
FIG. 22 is a plan view of a sheet material cut-out shape for a road sign according to another embodiment of the invention.
Figure 23:
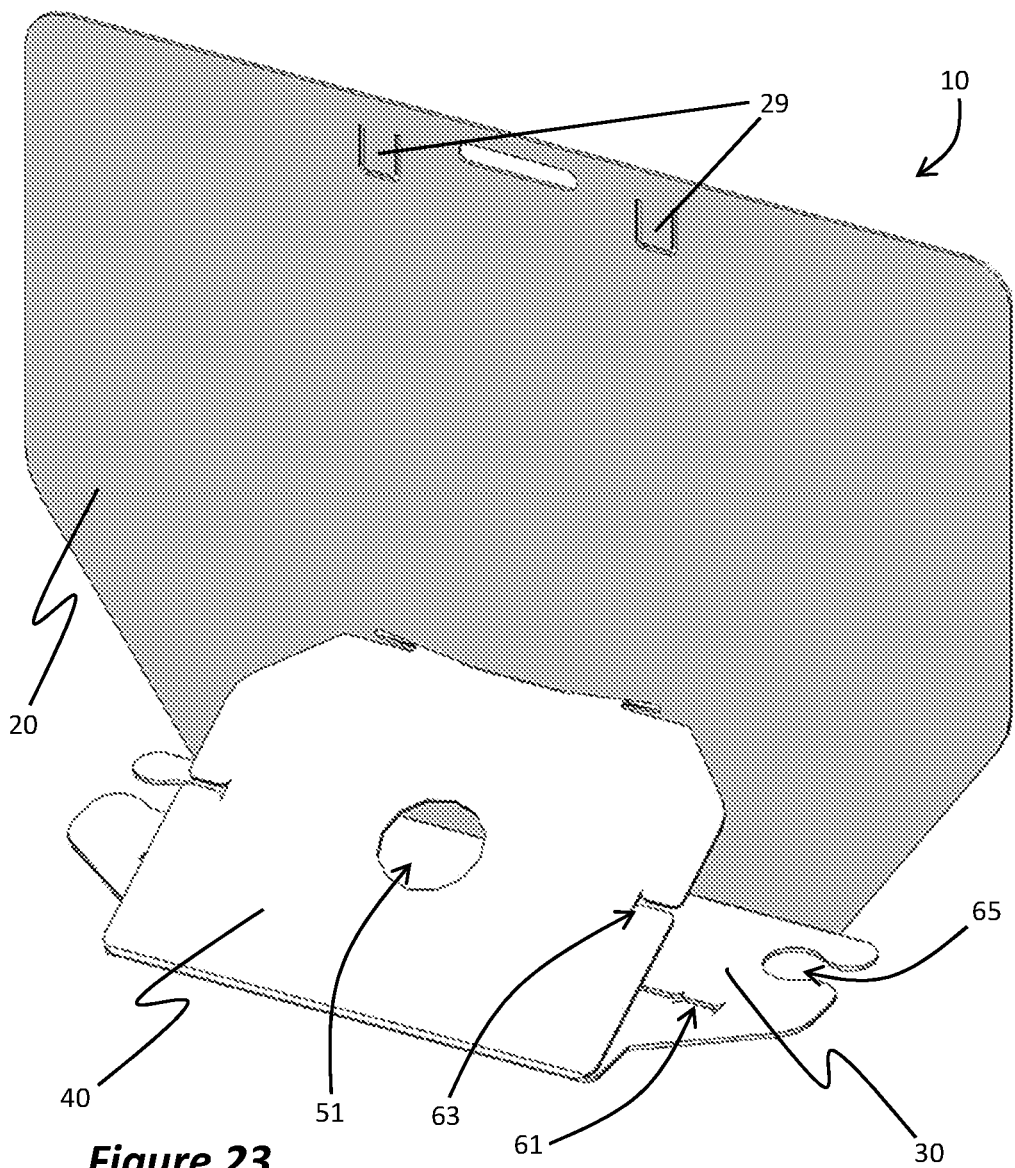
FIGS. 23 and 24 are rear-overhead perspective and overhead views, respectively, of a road sign in deployed configuration according to the cut-out shape of FIG. 22.
Figure 24:
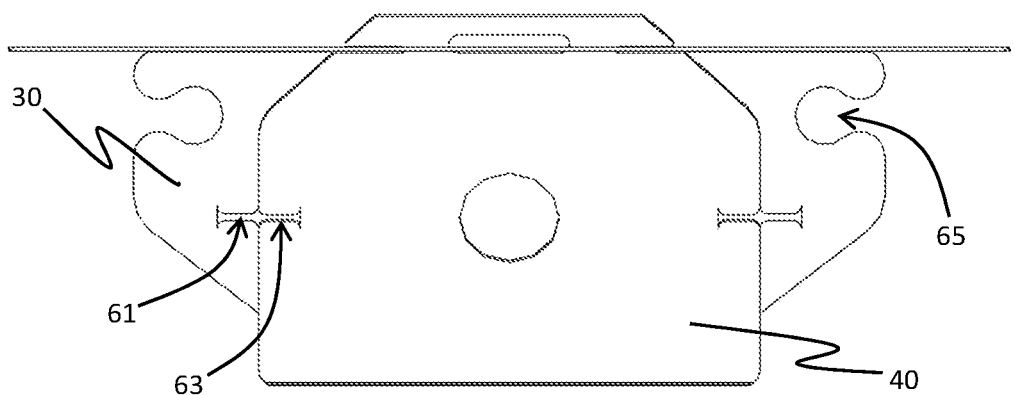
Figure 25:
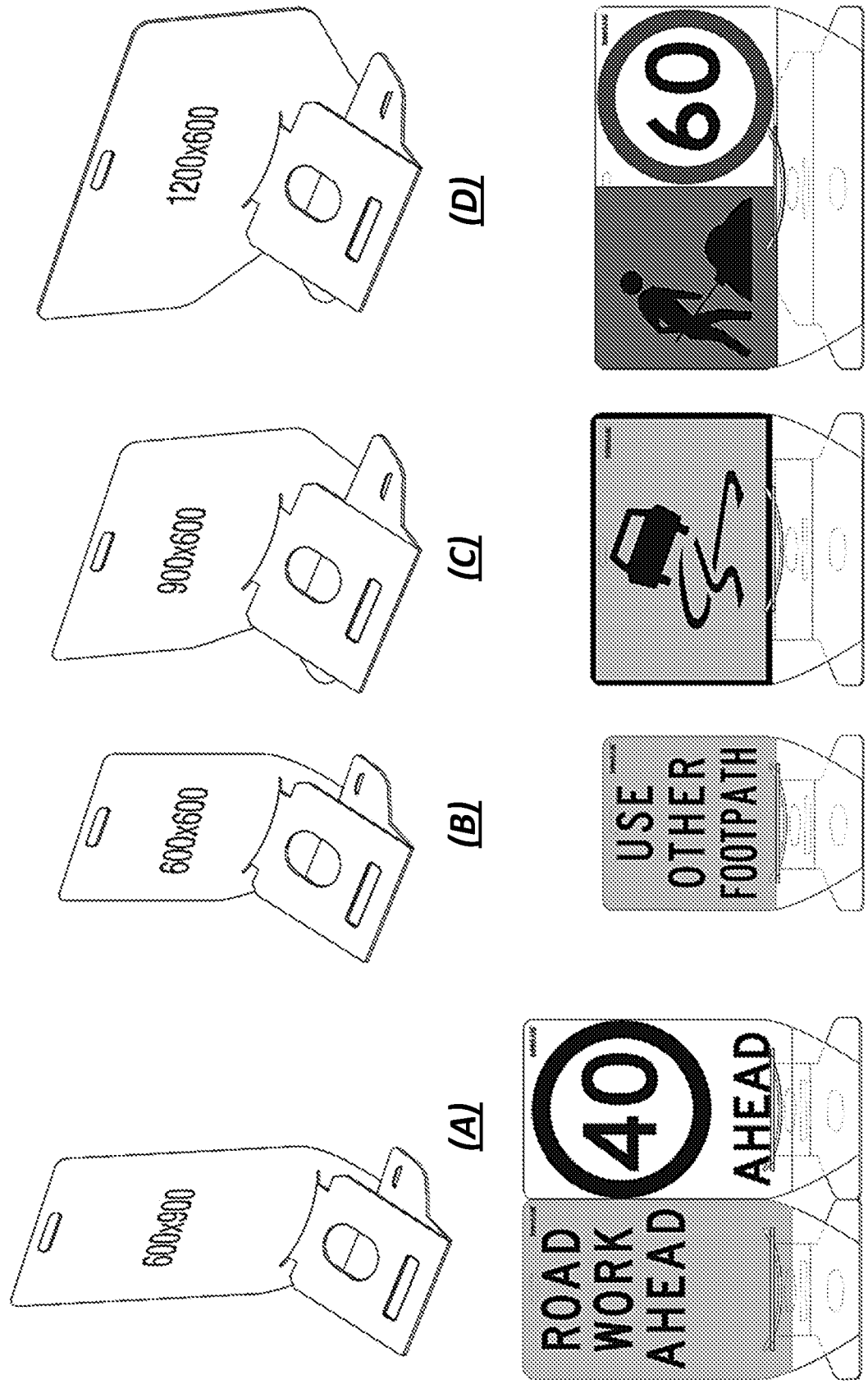
FIG. 25 shows rear perspective and front views of several different sizes of road signs constructed according to embodiments of the invention.
Figure 26:
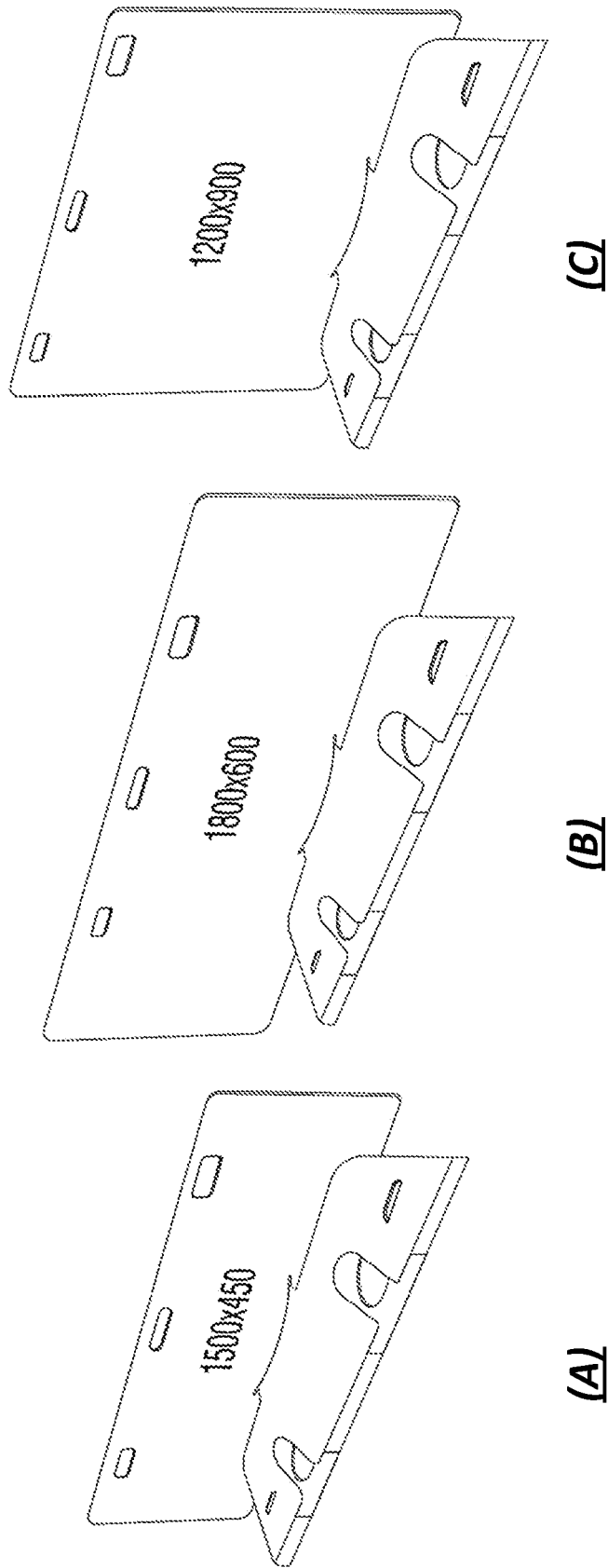
FIG. 26 shows rear perspective views of several different sizes of road signs constructed according to alternative embodiments of the invention

FIGS. 22-24 show the signage structure 10 and corresponding flat pattern 11 incorporating some additional and/or alternative features. In this case, the apertures 61 formed in the base panel 30 align with slots 63 formed in the brace panel 40. In this embodiment the base panel 30 is also provided with side openings 65, which may be used to temporarily secure the signage structure 10, in use, to an upright post or the like. The embodiment shown in FIGS. 22-24 also has a pair of tabs 29 formed in the display panel 20, located to each side of the handle aperture 22. The tabs 29 are provided to enable the display panel 20 to be temporarily fastened to the brace panel 40 when the signage structure in its folded configured for transportation (e.g. as seen in FIGS. 12 and 13). Specifically, the tabs 29 are positioned in alignment with the slots 48 so that, when the signage is folded in two across hinge line 32, the tabs 29 can be inserted in the respective slots 48.

Various sizes of the signage structure may be provided to accommodate different signage display dimensions according to conventional use in practice. For example, different signage structures may be provided to suit signage areas (e.g. region 25 outlined in FIGS. 6 and 7) corresponding to standard sizes such as 600×600 mm, 900×600 mm, 1200×600 mm, 1200×900 mm, etc. Several different representative sizes of signage structures are shown in FIGS. 22 (A)-(D).

Larger signage structures may also be formed according to embodiments of the present invention, such as 1500×450 mm, 1800×600 mm, 1200×900 mm, etc. For such larger sized signage structures it may be advantageous to utilise more than one portable weighted bollard to secure the structure in place in the manner previously described. FIGS. 23 (A)-(C) show representative larger sized signage structures that are formed with relatively wide base and brace panels commensurate with the wider display panels. The relatively wide bases are able to accommodate two portable weighted bollards side by side. In the embodiments seen in FIG. 23, the equivalent of the apertures 51 and 52 are in the form of a rearward facing slot-like opening, whereby the bollards may be slid into the base of the signage structure from the rear, after it is assembled for deployment.

The sheet material substrate used to form the signage structure is, in one embodiment, a polypropylene plastic sheet with a thickness in the order to 5-6 mm. This has been found to possess the required properties of stiffness and durability for the application, although a number of other polymer, fibre and/or composite sheet materials may alternatively be employed as will be recognised by those skilled in the art. The sheet material substrate may comprise a single layer of material or may be laminated from different materials or constructions, for example including a honeycomb or corrugated sandwich layer for enhanced rigidity while maintaining relatively low weight. Most preferably, the sheet material substrate comprises a laminate material having a polypropylene honeycomb/cellular core structure sandwiched between two surface plates of polypropylene or other polymer film/sheet. This variety of material has properties including being lightweight, stiff, high compressive strength, but still able to be readily cut and formed.

While the relative dimensions shown in the drawings are intended to be generally representative of practical implementation, it will be appreciated that significant variation may be possible without substantial departure from the functional considerations discussed above. In one variation that may not be otherwise apparent, the slot or slit 28 may be formed in a shallow arc or curve, preferably with the ends curved downwardly when the display panel 20 is upright. This may require the end 45 of the brace panel 40 to itself be correspondingly curved to engage in the slot 28, an arrangement that is thought to provide a more secure engagement and greater structural integrity. In the alternative, the arcuate portion of the slot 28 may engage in a slot or slit in the brace panel 40, such as the handle aperture 42.

Figure 27:
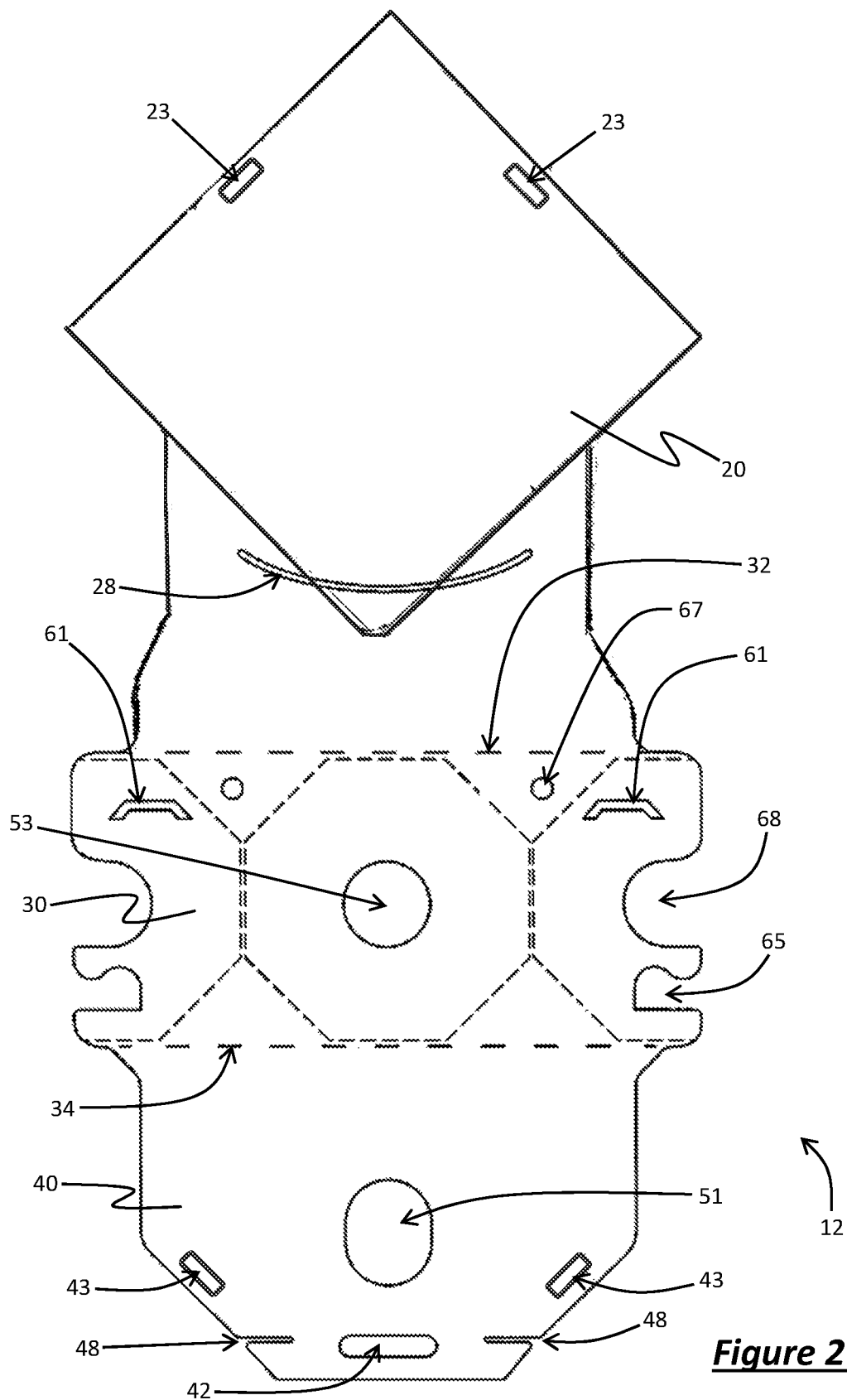
FIG. 27 is a plan view of a sheet material cut-out shape for a road sign according to another embodiment of the invention.
Figure 28:
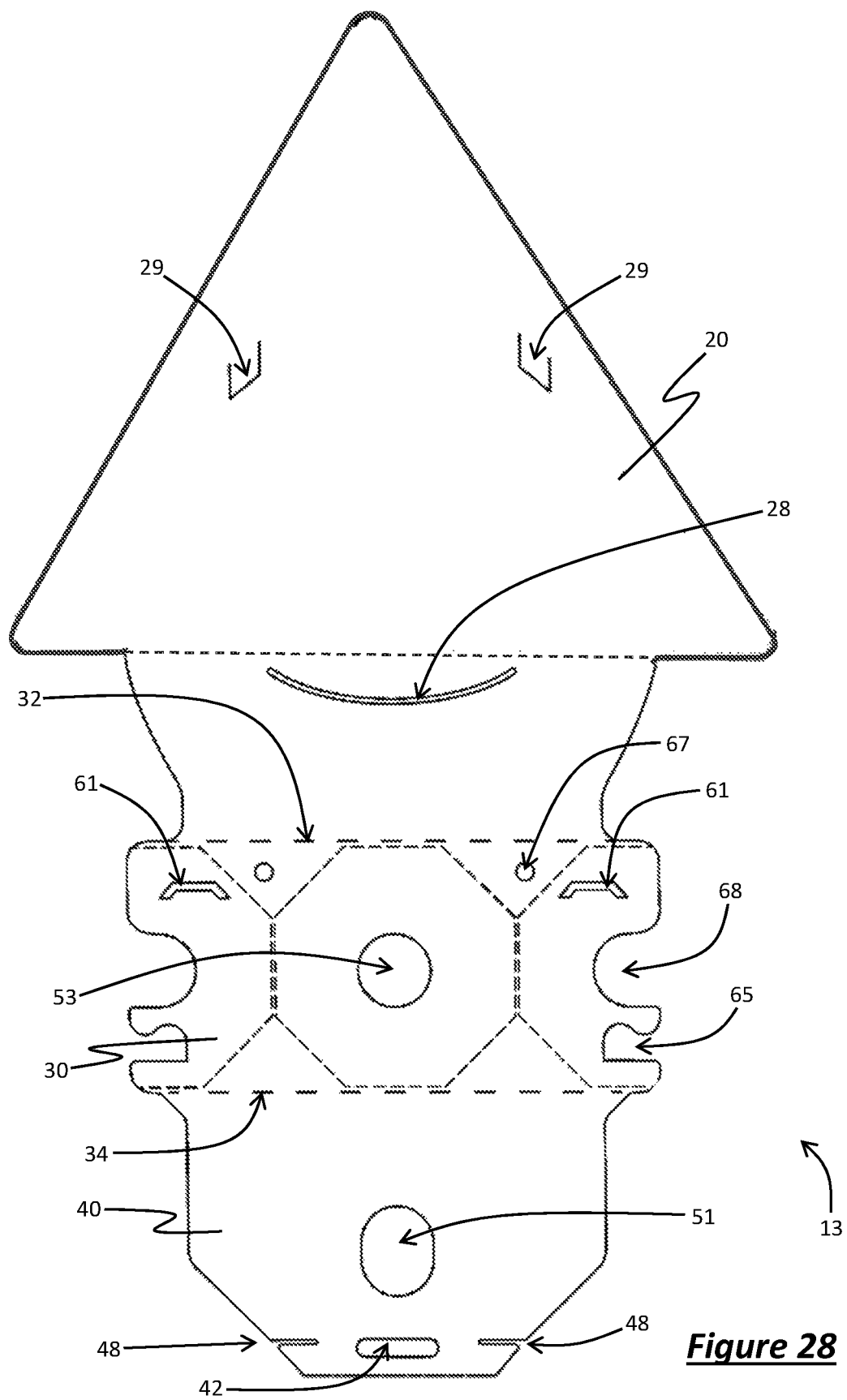
FIG. 28 is a plan view of a sheet material cut-out shape for a road sign according to another embodiment of the invention.

The embodiments and examples of the invention described hereinabove have a display panel 20 with a rectangular indicia display area (e.g. region 25), however it is equally possible to create signage structures with different display panel shapes that may be required or suitable to comply with rules, regulations and/or practices in different jurisdictions where other indicia display areas are used. For example, in some jurisdictions such as the United States it is common for temporary road signs to have a display area with a square shape in which the side edges are angled at 45 degrees (i.e. a 'diamond' shape), whereas in other jurisdictions such as Europe a common shape for temporary road sign indicia is triangular. FIG. 27 shows an example embodiment of a sheet material cut-out pattern 12 of a sign flat panel with a display panel 20 adapted for a diamond shaped sign. FIG. 28 shows an example embodiment of a sheet material cut-out pattern 13 of a sign flat panel with a display panel 20 adapted for a triangular shaped sign. The sign panel sheet materials patterned according to the shapes 12 and 13 can be assembled into deployed signs in the same manner as described hereinbefore by bending at the hinges 32, 34 and engaging the end portion of the brace panel 40 with the display panel 20 by means of the slots 28, 48. The flat panel sheets 12, 13 can also be folded in two about hinge 32 as previously described for transportation from site to site. The pattern 12 shown in FIG. 27 is designed so that, when folded in two, the handle apertures 23 and 43 align with one another. In the case of pattern 13, when folded in two for transportation the tabs 29 on the display panel 20 may be used to latch over the tapered edges of the brace panel 40 adjacent the slits 48. The flat panel patterns 12, 13 also include additional alternative formations for temporarily securing the signage structure in situ when deployed, including apertures 67 adapted to receive a star picket or the like, and recesses 68 that may accommodate a bollard post when two signs are placed immediately side-by-side.

The invention has been described by way of non-limiting example only and many modifications and variations may be made thereto without departing from the spirit and scope of the invention.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The invention claimed is:

1. A temporary road sign structure comprising:
   a sheet material substrate cut into a flat pattern having three interconnected panels, the three interconnected panels including:
   a display panel;
   a base panel; and
   a brace panel
   wherein the display panel and brace panel each being connected to the base panel at opposite edges thereof defined by first and second parallel hinge lines,
   wherein an extent of the display panel orthogonal to the first hinge line is substantially equal to a combined extent of the base panel and brace panel, and
   wherein an end of the brace panel opposite the second hinge line is adapted to engage with the display panel, in use, to form a self-supporting structure in which the display panel is held upright when the base panel is placed on a ground surface.

2. The temporary road sign structure according to claim 1 adapted for arrangement into a first transportation configuration wherein the display panel is folded flat onto the base panel and brace panel about the first hinge line, and into a second deployment configuration to form a self-supporting structure in which the display panel is articulated about the first hinge line so as to be approximately orthogonal to the base panel, and the brace panel is articulated about the second hinge line to form an acute angle between the base panel and the brace panel toward its engagement with the display panel.

3. The temporary road sign structure according to claim 1, wherein the display panel and the brace panel are each provided with respective handle apertures or fitments towards their opposed edges, wherein the respective handle apertures or fitments substantially align with one another when the display panel is folded over along the first hinge line relative to the base panel and brace panel to as to configure the temporary road sign structure for transportation.

4. The temporary road sign structure according to claim 1, wherein the end of the brace panel opposite the second hinge line is provided with one or more tabs, tongues or flanges constructed to, in use, be inserted into or through a slit or slot formed in the display panel to create an interference fit engagement.

5. The temporary road sign structure according to claim 4, wherein the slit or slot formed in the display panel has an arcuate shape for enhanced retention of the end of the brace panel when inserted therein.

6. The temporary road sign structure according to claim 1, wherein the base panel is formed with one or more guide post receiving apertures adapted to receive a roadside guide post such that the temporary road sign structure may be, in use, lowered over a roadside guide post to thereby hold the temporary road sign structure in situ.

7. The temporary road sign structure according to claim 6, wherein the one or more guide post receiving apertures are aligned with one or more corresponding guide post receiving slots formed at side edges of the brace panel.

8. The temporary road sign structure according to claim 6, wherein the one or more guide post receiving apertures are aligned with one or more corresponding guide post holes formed near a top edge of the display panel.

9. The temporary road sign structure according to claim 1, wherein the brace panel is formed with a centrally positioned bollard aperture adapted to accommodate a post of a portable weighted bollard such that, in use, a weighted bollard base is received within a space between the base panel and brace panel with the post extending up through the bollard aperture.

10. The temporary road sign structure according to claim 1, wherein the display panel has a width, parallel to the first hinge line, which is greater a width of the base panel, which in turn is greater than a width of the brace panel.

11. The temporary road sign structure according to claim 1, wherein the sheet material substrate comprises a plastics laminate material.

12. The temporary road sign structure according to claim 9, wherein the sheet material substrate comprises a laminate material having a polypropylene honeycomb or cellular core structure sandwiched between two surface plates of polypropylene or other polymer film.

13. A portable temporary road sign comprising the temporary road sign structure of claim 1, the portable temporary road sign having road sign indicia applied to a surface of the display panel in the form of a decal, sticker or the like.

14. A method of forming, transporting and deploying a temporary road signage structure, including:
    forming a sheet material substrate into a flat pattern having three interconnected panels comprising a display panel, a base panel, and a brace panel, the display panel and brace panel each being connected to the base panel at opposite edges thereof defined by first and second parallel hinge lines, wherein an extent of the display panel orthogonal to the first hinge line is substantially equal to a combined extent of the base panel and brace panel, and wherein an end of the brace panel opposite the second hinge line is adapted to engage with the display panel, in use, to form a self-supporting structure in which the display panel is held upright when the base panel is placed on a ground surface;
    configuring the road signage structure into a transportation configuration wherein the display panel is folded onto the base panel and brace panel about the first hinge line;
    carrying the road signage structure to a desired location; and
    deploying the road signage structure by configuring it into said self-supporting structure.

15. The method according to claim 14, wherein the sheet material substrate comprises a plastics laminate material.

16. The method according to claim 15, wherein the sheet material substrate comprises a laminate material having a polypropylene honeycomb or cellular core structure sandwiched between two surface plates of polypropylene or other polymer film.

17. The method according to claim 14, wherein the step of deploying the road signage structure includes incorporating a bollard weighted base onto a space between the base panel and brace panel, in use.

18. The method according to claim 14, wherein the step of deploying the road signage structure includes lowering the base panel over a roadside guide post such that the post projects through an aperture formed in the base panel.

19. The method according to claim 14, including the step of applying road sign indicia, in the form of a decal, sticker or the like, to a surface of the display panel.

\* \* \* \* \*